United States Patent
Leclair et al.

(10) Patent No.: US 10,013,338 B2
(45) Date of Patent: Jul. 3, 2018

(54) TECHNIQUES FOR AUTOMATED SOFTWARE TESTING

(75) Inventors: Steven Leclair, Harrisville, RI (US);
Enrique Ramirez, Putnam, CT (US);
Dana Yurach, Mendon, MA (US);
Laura Turner, Stonington, CT (US);
Allen Caswell, Franklin, MA (US);
Mark Robinson, Uxbridge, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 0 days.

(21) Appl. No.: 13/816,823

(22) PCT Filed: Sep. 20, 2011

(86) PCT No.: PCT/US2011/052319
§ 371 (c)(1),
(2), (4) Date: May 20, 2013

(87) PCT Pub. No.: WO2012/040178
PCT Pub. Date: Mar. 29, 2012

(65) Prior Publication Data
US 2013/0232474 A1 Sep. 5, 2013

Related U.S. Application Data

(60) Provisional application No. 61/386,202, filed on Sep. 24, 2010.

(51) Int. Cl.
*G06F 11/36* (2006.01)
*G06F 9/44* (2018.01)
*G06F 9/455* (2018.01)

(52) U.S. Cl.
CPC ............ *G06F 11/3668* (2013.01); *G06F 9/44* (2013.01); *G06F 11/3672* (2013.01); *G06F 9/455* (2013.01)

(58) Field of Classification Search
None
See application file for complete search history.

(56) References Cited

U.S. PATENT DOCUMENTS 6,456,955 B1 9/2002 Andrews et al.
7,624,380 B2 11/2009 Okada
(Continued)

FOREIGN PATENT DOCUMENTS

JP 4148527 B2 7/2008

OTHER PUBLICATIONS

"UNIFI: A Revolutionary Scientific Information System Supporting Biotherapeutic LC/High Resolution MS Studies in both Non-Regulated and GXP Laboratories," WCBP, Washington, D.C., Jan. 10-12, 2011.
(Continued)

*Primary Examiner* — Wynuel Aquino

(57) ABSTRACT

Described are techniques for testing an application. A test script including one or more instructions is received to test an application. A user interaction with a user interface of the application is emulated. Emulating includes executing a first portion of instructions in the test script. An output is received including information displayed using the user interface in response to the user interaction. Verification processing is performed for the output. The verification processing includes executing a second portion of instructions in the test script. A first instruction in the test script references a user interface data element without specifying a complete path for the user interface data element.

23 Claims, 21 Drawing Sheets

(56) References Cited

U.S. PATENT DOCUMENTS

| | | |
|---|---|---|
| 8,645,912 B2* | 2/2014 | Welchman et al. ............ 717/106 |
| 2004/0122702 A1 | 6/2004 | Sabol et al. |
| 2005/0010877 A1* | 1/2005 | Udler ............................ 715/826 |
| 2005/0257198 A1* | 11/2005 | Stienhans et al. ............. 717/124 |
| 2006/0178918 A1 | 8/2006 | Mikurak |
| 2007/0022407 A1* | 1/2007 | Givoni ................ G06F 11/3414 717/124 |
| 2007/0101273 A1* | 5/2007 | Lin ....................... G06F 19/708 715/738 |
| 2007/0282885 A1* | 12/2007 | Baude et al. ................. 707/102 |
| 2008/0072100 A1 | 3/2008 | Okada |
| 2008/0072182 A1 | 3/2008 | He et al. |
| 2008/0127103 A1* | 5/2008 | Bak .............................. 717/126 |
| 2008/0155515 A1* | 6/2008 | Stewart ........................ 717/135 |
| 2008/0201098 A1* | 8/2008 | Manfredi ..................... 702/108 |
| 2009/0198386 A1* | 8/2009 | Kim et al. .................... 700/298 |
| 2009/0300056 A1* | 12/2009 | Fu et al. ....................... 707/102 |
| 2010/0204973 A1 | 8/2010 | Parkinson et al. |
| 2010/0251217 A1* | 9/2010 | Miller .......................... 717/126 |
| 2011/0004868 A1* | 1/2011 | Bharadwaj ................... 717/135 |

OTHER PUBLICATIONS

PCT Application No. PCT/US2011/052319, International Search Report dated Feb. 9, 2012.
IPRP from Counterpart PCT Application PCT/US2011/052319 dated Apr. 4, 2013.
Japanese Office Action dated Dec. 22, 2014.

* cited by examiner

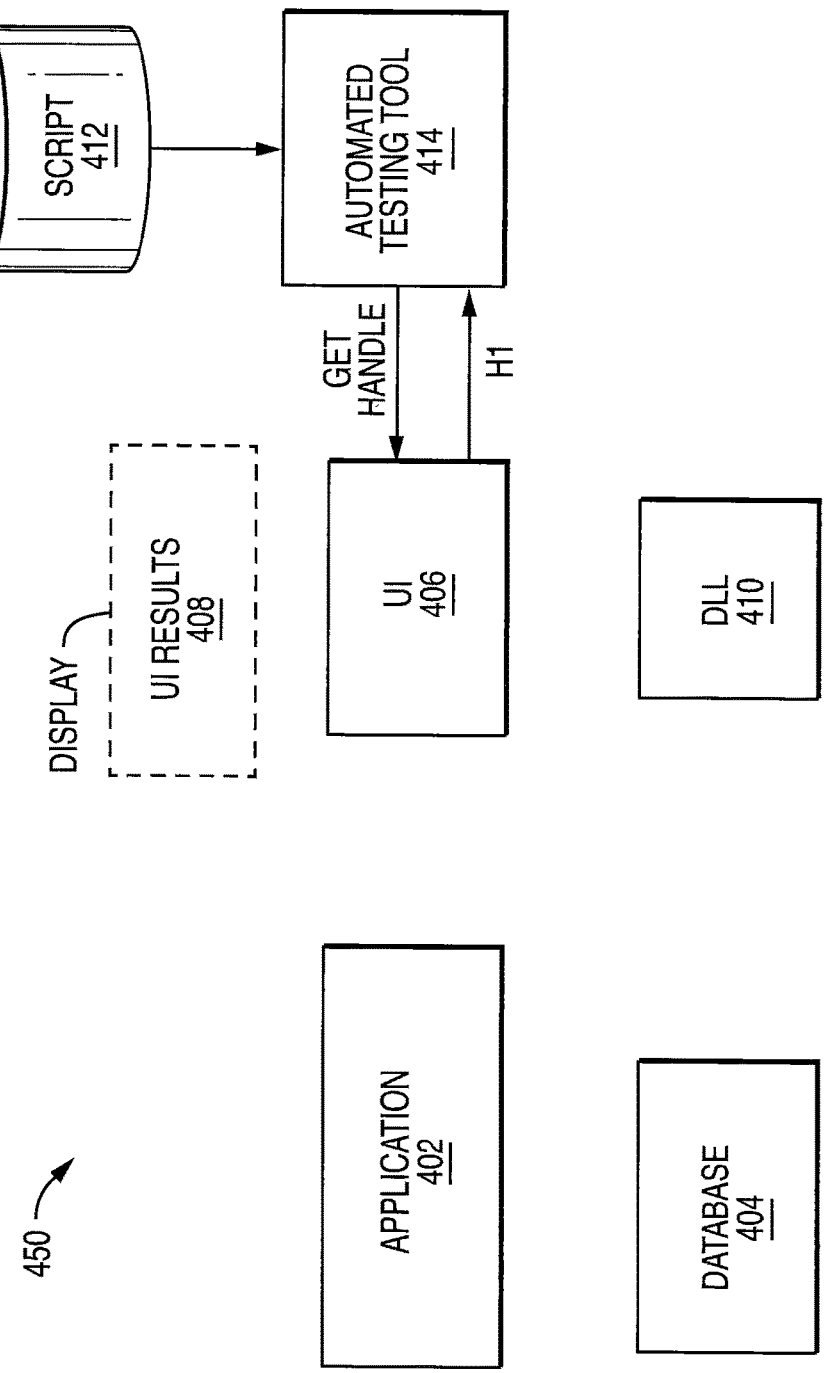

AQV+ TEST REPORT 1.0  CREATION DATE: WEDNESDAY, 04 AUGUST 2010

COMPANY NAME: WATERS
WATER TEST ENGINEER: RALLUCA LUCA
EXECUTION DATE: 8/4/2010 10:56:31 AM
EMPOWER VERSION: VERSION:3154 SERVICE PACKS: 3
WINDOWS PLATFORM: MICROSOFT WINDOWS 7 BUSINESS, 64-BIT 6.1 BUILD 7600

TOTAL TESTS: 3
PASSED TESTS: 2
FAILED TESTS: 1

| TEST NAME | START DATE | END DATE | RESULT (PASS/FAIL) | INITIALS | COMMENTS |
|---|---|---|---|---|---|
| CONFIGURATION VERIFICATION | 8/4/2010 10:58:26 AM | 8/4/2010 11:01:36 AM | ☒ PASSED | RL | |
| PASSWORD COMPLEXITY VERIFICATION | 8/4/2010 11:01:36 AM | 8/4/2010 11:02:35 AM | ☒ PASSED | RL | |
| ACCESS VERIFICATION | 8/4/2010 11:02:35 AM | 8/4/2010 11:03:05 AM | ☒ FAILED | RL | |
| | | | | | |
| | | | | | |
| | | | | | |
| | | | | | |

FIG. 11A

CONFIGURATION VERIFICATION TEST PARAMETERS

1100

1102

1106

| NAME | DESCRIPTION | VALUE |
|---|---|---|
| ADMIN USER ACCOUNT | ADMIN USER ACCOUNT NAME USED FOR LOGIN | SYSTEM |
| ADMIN PASSWORD | ADMIN PASSWORD USED FOR LOGIN | MANAGER |
| ADMIN USER TYPE | ADMIN USER TYPE USED WHEN LOGIN | ADMINISTRATOR |
| APP TIMEOUT | TO SET THE TIMEOUT IN THE SYSTEM POLICIES-OTHER POLICIES PAGE | 10 |
| NEW ADMIN USER TYPE 1 NAME | NEW ADMIN USER TYPE NUMBER ONE - NAME | OQ_ADMINISTRATOR |
| NEW NONADMIN USER TYPE 1 NAME | NEW NONADMIN USER TYPE NUMBER ONE - NAME | OQ_ANALYT |
| NEW NONADMIN USER TYPE 2 NAME | NEW NONADMIN USER TYPE NUMBER TWO - NAME | OQ_CHEMIST |
| NEW NONADMIN USER TYPE 3 NAME | NEW NONADMIN USER TYPE NUMBER THREE - NAME | OQ_REVIEWER |

FIG. 11B

| | | | CONFIGURATION VERIFICATION | |
|---|---|---|---|---|
| STEP | PROCEDURE | EXPECTED RESULTS | ACTUAL RESULTS | RESULT |
| STEP 1 | LOGIN TO THE EMPOWER SERVER AS AN ADMINISTRATOR AND DOUBLE CLICK ON THE DATE TIME PROPERTIES IN THE SYSTEM TRAY AND CLICK THE DATE TIME TAB. ALTER THE DATE FROM TODAY DATE TO A FUTURE DATE AND CLICK APPLY AND OK. RECORD TODAY DATE. RECORD THE FUTURE DATE. DOUBLE CLICK ON THE DATE TIME PROPERTIES AND CLICK THE DATE TIME TAB. VERIFY THE DEFAULT DATE IS THE FUTURE DATE RECORDED IN THIS STEP. TAKE A SCREEN CAPTURE. CHANGE THE DATE BACK TO TODAY DATE AND TIME RECORDED IN THIS STEP. CLICK APPLY AND OK. LOG OFF THE MACHINE. | THE ADMINISTRATOR ON THE EMPOWER SERVER WAS ABLE TO MODIFY THE DATE TIME PROPERTIES. | | |
| STEP 2 | LOGIN TO THE EMPOWER SERVER AS A TYPICAL (NON-ADMIN) USER. RECORD THE LOGIN. VERIFY THAT THE USER IS DENIED ACCESS TO THE DATE TIME PROPERTIES ON THE EMPOWER SERVER. LOG OFF THE MACHINE. | ACCESS IS DENIED TO THE EMPOWER SERVER. | | |
| STEP 3 | LOGIN TO A MACHINE WITH AN EMPOWER CLIENT INSTALLED USING AN APPROPRIATE NETWORK USER ACCOUNT. RECORD THE MACHINE NAME AND LOGIN. | LOGIN AND MACHINE NAME RECORDED. | MACHINE NAME: EMP3W7 DOMAIN: WATERSRO LOGIN USER: ADMINISTRATOR | |
| STEP 4 | LOGIN TO EMPOWER WITH AN ADMINISTRATIVE LEVEL USER NAME AND PASSWORD AND SELECT THE PRO INTERFACE. ONCE THE EMPOWER PRO WINDOW APPEARS, CLICK CONFIGURE SYSTEM. RECORD THE USER USED TO LOGIN. | LOGIN TO THE PRO INTERFACE SUCCESSFUL AND USER RECORDED. | LOGIN TO THE PRO INTERFACE WITH USER: 'SYSTEM' WAS SUCCESSFUL. | PASS |
| STEP 5 | UNDER VIEW, SELECT SYSTEM POLICIES. TAKE A SCREEN CAPTURE OF THE USER ACCOUNT POLICIES TAB. LABEL THE SCREEN CAPTURE WITH ORIGINAL VALUES. | USER ACCOUNT POLICIES SCREEN CAPTURE ATTACHED. | SCREEN SHOT SHOWS THE ORIGINAL VALUES' FOR THE USER ACCOUNT TAB IN SYSTEM POLICIES. SEE PICTURE. CONFIGURATION VERIFICATION_STEP5_PICTURE_1 | PASS |
| STEP 6 | SET THE USER ACCOUNT POLICIES AS DEFINED BELOW: AUTHENTICATION: LOCAL AUTHENTICATION ENFORCE UNIQUE USER ACCOUNT NAME: SELECTED ENFORCE UNIQUE USER PASSWORDS: SELECTED PASSWORDS EXPIRE EVERY (DAYS): SELECTED, VALUE: 1 LIMIT # OF ENTRY ATTEMPTS TO (TRIES): SELECTED, VALUE: 3 ENFORCE MINIMUM PASSWORD LENGTH OF (CHARACTERS): SELECTED, VALUE: 6 DON'T ALLOW APPLICATIONS TO STAY RUNNING AFTER LOGGING OFF: NOT SELECTED DON'T ALLOW MULTIPLE LOGINS: NOT SELECTED GLOBAL DEFAULT USER INTERFACE: PRO TAKE A SCREEN CAPTURE OF THE USER ACCOUNT POLICIES TAB. | USER ACCOUNT POLICIES CONFIGURED. SCREEN CAPTURE ATTACHED. | SCREEN CAPTURE SHOWS THE USER ACCOUNT TAB IN SYSTEM POLICIES HAS BEEN CONFIGURED. SEE PICTURE: CONFIGURATION VERIFICATION_STEP6_PICTURE_2 | PASS |
| STEP 7 | SELECT THE NEW PROJECT POLICIES TAB. SET THE NEW PROJECT POLICIES AS DEFINED IN THE TABLE BELOW: FULL AUDIT TRAIL SUPPORT: SELECTED PROJECT OBJECT: RESULT; COMMENT: UNRESTRICTED; CONFIRM IDENTITY: NOT SELECTED; DON'T ALLOW USER TO CHANGE DEFAULT FULL AUDIT. | NEW PROJECT POLICIES CONFIGURED. SCREEN CAPTURE ATTACHED. | | |

FIG. 11C

| ACCEPTANCE CRITERIA | | CONFIGURATION VERIFICATION |
|---|---|---|
| ALL RESULTS IN THIS TEST ARE ACCEPTABLE (YES/NO)? IF NO, THEN REFER TO DEVIATIONS AND DISCREPANCIES IDENTIFIED BELOW. | | |
| ALL APPLICABLE PRINTOUTS AND SCREEN CAPTURES HAVE BEEN LABELED APPROPRIATELY AND PROVIDED IN THE ATTACHMENTS SECTION OF THIS TEST (YES/NO)? | | |
| COMMENTS (WATERS ENGINEER) | | |
| | | |
| | | |
| | | |
| EXECUTED AND VERIFIED BY (SIGN/DATE): | SIGNATURE | DATE |
| REVIEWED BY (SIGN/DATE): | SIGNATURE | DATE |

PASSWORD COMPLEXITY VERIFICATION

PASSWORD COMPLEXITY VERIFICATION TEST PARAMETERS

| NAME | DESCRIPTION | VALUE |
|---|---|---|
| ADMIN USER ACCOUNT | ADMIN USER ACCOUNT NAME USED FOR LOGIN | SYSTEM |
| ADMN PASSWORD | ADMIN PASSWORD USED FOR LOGIN | MANAGER |
| ADMIN USER TYPE | ADMIN USER TYPE USED WHEN LOGIN | ADMINISTRATOR |
| USER ACCOUNT | USER ACCOUNT NAME USED FOR LOGIN | OQ_ANALYST |
| PASSWORD | PASSWORD USED FOR LOGIN | OQANAYLST |
| INCORRECT PASSWORD | INCORRECT PASSWORD USED FOR LOGIN | TODAY |
| USER TYPE | USER TYPE USED WHEN LOGIN | OQ_ANALYST |
| APP TIMEOUT | TO SET THE TIMEOUT IN THE SYSTEM POLICIES - OTHER POLICIES PAGE | 1 |
| APP1 TIMEOUT | TO SET THE TIMEOUT IN THE SYSTEM POLICIES - OTHER POLICIES PAGE AFTER FUNCTIONALITY WAS CHECKED | 30 |
| DEFAULT COMMENT | COMMENT REQUIRED FOR SAVING CHANGES | YOUR COMMENT |
| PASS EXPIRATION DAYS | NR OF DAYS IN UNTIL PASSSWORD NEEDS TO CHANGE | 1 |
| MAX LOGIN ATTEMPTS | NR OF MAXIMUM INVALID LOGIN ATTEMPTS | 3 |

ACCESS VERIFICATION

ACCESS VERIFICATION TEST PARAMETERS

| NAME | DESCRIPTION | VALUE |
|---|---|---|
| ADMIN USER ACCOUNT | ADMIN USER ACCOUNT NAME USED FOR LOGIN | SYSTEM |
| ADMN PASSWORD | ADMIN PASSWORD USED FOR LOGIN | MANAGER |
| ADMIN USER TYPE | ADMIN USER TYPE USED WHEN LOGIN | ADMINISTRATOR |
| USER ACCOUNT | USER ACCOUNT NAME USED FOR LOGIN | OQ_ANALYST |
| PASSWORD | PASSWORD USED FOR LOGIN | WATERS |
| PROJECT NAME | PROJECT NAME USED IN THE TEST CASE | OQ_QUAL |
| PROJECT RESTORE NAME | NAME USED IN THE TEST CASE FOR RESTORE PROJECT | OQ_QUAL RESTORED |
| VIEW FILTER NAME | VIEW NAME | OQ_TEST_NOW |
| SERVER NAME | SERVER NAME | EMP3W7 |

FIG. 11E-2

ACCESS VERIFICATION

| STEP | PROCEDURE | EXPECTED RESULTS | ACTUAL RESULTS | RESULT |
|---|---|---|---|---|
| STEP 1 | LOGIN TO EMPOWER WITH THE OQ_ANALYST ACCOUNT AND PASSWORD (FROM ACC - 1.2.1 STEP 10). CLICK CONFIGURE SYSTEM. CLICK FILE>NEW AND CONFIRM THAT THE FOLLOWING ARE GRAYED OUT: PROJECT USER, USER GROUP, USER TYPE, PLATE TYPE. TAKE A SCREEN CAPTURE. PRINT OUT THE SCREEN CAPTURE, LABEL IT APPROPRIATELY AND ATTACH IT TO THIS TEST. | OQ_ANALYST HAS LIMITED SYSTEM CONFIGURATION PRIVILEGES. | COULD NOT OPEN CONFIGURE MANAGER. SEE PICTURE: ACCESS VERIFICATION_STEP1_PICTURE_1 | FAIL |
| STEP 2 | SELECT PROJECTS AND VERIFY THAT THE OQ_QUAL PROJECT IS IN THE LIST. VERIFY THAT THE FULL AUDIT TRAIL CHECKBOX IS SELECTED AND CANNOT BE MODIFIED. | THE FULL AUDIT TRAIL CHECKBOX IS SELECTED FOR THE OQ_QUAL PROJECT AND CANNOT BE MODIFIED. | | |
| STEP 3 | RIGHT-CLICK ON THE OQ_QUAL PROJECT AND CLICK PROPERTIES. VERIFY THAT A MESSAGE APPEARS INDICATING YOU DO NOT HAVE ANY PRIVILEGE TO ALTER THIS PROJECT. CLICK OK IN THE MESSAGE BOX. CLICK CANCEL. RIGHT-CLICK ON THE PROJECT AGAIN AND SELECT LOCK PROJECT. VERIFY THAT ALL OPTIONS ARE UNAVAILABLE. | NO CHANGES CAN BE MADE TO THE CONFIGURATION ON THE GENERAL AND ACCESS TABS. NO LOCK PROJECT OPTIONS ARE AVAILABLE. | | |
| STEP 4 | RIGHT-CLICK ON THE OQ_QUAL PROJECT AND SELECT OPEN. SELECT THE CHANNELS TAB. RIGHT-CLICK THE ROW IN THE TABLE AND SELECT ALTER SAMPLE. IF A WARNING MESSAGE APPEARS, CLICK OK. VERIFY THAT NO FUNCTIONS ARE AVAILABLE TO ALTER THE SAMPLE. NOTE: COMPONENT INFORMATION CAN BE CHANGED, BUT THE SAMPLE ITSELF CANNOT BE ALTERED. CLOSE THE OQ_QUAL PROJECT. | NO ALTER SAMPLE FUNCTIONS. | | |
| STEP 5 | RIGHT-CLICK ON THE OQ_QUAL PROJECT AND SELECT BACKUP PROJECT. IF A COMMENT IS REQUIRED, ENTER OQ TESTING IN THE COMMENTS BOX OR SELECT A COMMENT FROM THE DROP-DOWN LIST AND CLICK OK. CLICK NEXT. IN THE SELECT DESTINATION WINDOW, SELECT THE LOWER RADIO BUTTON AND CLICK BROWSE. SELECT A LOCATION FOR THE BACKUP (NOT THE WATERS_PROJECTS$ FOLDER) AND CLICK NEXT. RECORD THE LOCATION. | BACKUP LOCATION RECORDED. | | |
| STEP 6 | VERIFY THAT "FILES COPIED SUCCESSFULLY" IS DISPLAYED IN THE BACKUP DISPLAY WINDOW. CLICK NEXT>FINISH. USING WINDOWS EXPLORER, BROWSE TO THE BACKUP LOCATION RECORDED IN STEP 5. OPEN THE OQ_QUAL FOLDER. OPEN THE BACKUP.LOG FILE THAT EXISTS IN THIS FOLDER. PRINT THIS FILE, LABEL IT APPROPRIATELY AND ATTACH IT TO THIS TEST. CLOSE THE BACKUP.LOG FILE. CLOSE WINDOWS EXPLORER. | EXPORT COMPLETED SUCCESSFULLY. THE SPECIFIED BACKUP.LOG FILE HAS BEEN PRINTED AND IS ATTACHED. | | |

TECHNIQUES FOR AUTOMATED SOFTWARE TESTING

This application is a National Stage of International Application No. PCT/US2011/052319, filed Sep. 20, 2011, which claims priority to U.S. Provisional Application No. 61/386,202, filed Sep. 24, 2010, all of which are incorporated by reference herein.

BACKGROUND

Technical Field

This application generally relates to computer systems, and more particularly to techniques used in connection with software testing.

Description of Related Art

Testing is part of the software development process and in computerized system governance activities including but not limited to computerized system qualification, verification, and validation activities (wherein computerized systems may also include instrumentation). It may be necessary to perform testing for various aspects of software. One way in which software may be tested includes manual testing such as using an application's user interface. With such manual testing, a user may manually interact with the application using the application's user interface, for example, to enter data as input values that may be utilized by an application, make menu selections, and the like. The testing process may also include verifying various aspects of the computerized system's behavior, results, outputs, and the like, in connection with user supplied inputs. Such verification may also be performed manually such as by visual inspection and/or comparison of observed output with expected output. It may be cumbersome, time consuming, and error prone to manually perform any such aspects of software testing.

It may be desirable to utilize an efficient technique for computerized system testing in an automated fashion that provides documented objective evidence of testing activities and results and provides for identification of passed as well as failed tests and assists in identifying potential causes for such failures.

SUMMARY OF THE INVENTION

In accordance with one aspect of the invention is a method for testing an application comprising: receiving a test script including one or more instructions to test an application; emulating a user interaction with a user interface of said application, said emulating including executing a first portion of said one or more instructions in said test script; receiving an output including information displayed using said user interface in response to said user interaction; and performing verification processing for said output, said verification processing including executing a second portion of said one or more instructions in said test script, wherein a first instruction in said test script references a user interface data element without specifying a complete path for said user interface data element, wherein said complete path identifies a location of said user interface data element in said user interface. The complete path may identify the location of said user interface data element and may include three or more levels. Information identifying one or more of said levels may be omitted from said first instruction when referencing said user interface data element. The first instruction may include a partial path specification for said user interface data element. The partial path specification may identify a top of said three or more levels corresponding to a root in a hierarchy and a bottom of said three or more levels corresponding to a leaf in said hierarchy. The first instruction may include a window identifier corresponding to said top level and a data element identifier for said user interface data element corresponding to said bottom level. The hierarchy may include four levels and said partial path specification may omit identification of all levels other than said top level and said bottom level. The method may also include searching for said user interface data element in said hierarchy. The first instruction may include criteria indicating a portion of the hierarchy to be excluded when searching for said user interface data element in said hierarchy. The first instruction may include a parameter having a customized value supplied by a customer. The test script may be used for a first customer providing a first input for said parameter and a second customer providing a second input different from said first input for said parameter. The testing script may be executed by a testing tool that communicates with said user interface and the method may further comprise issuing a first request by said testing tool to said user interface for a handle to said user interface data element and providing, by said user interface, said handle to said testing tool in response to said first request. The method may also include issuing, by said testing tool to a first code module, a second request to retrieve said user interface data element using said handle; issuing, by said first code module to said application, a third request to retrieve said user interface data element using said handle; providing, by said application, first data including said user interface data element to said first code module in response to said third request; and providing, by said first code module, said user interface data element to said testing tool. The first code module may process said first data to generate said user interface data element in a format expected by said testing tool. The user interface data element may be a table of a plurality of data values. The user interface data element may be any of a row, a column or an element in a multi-dimensional vector. The data element identifier may be a name referenced by said application uniquely identifying said user interface data element from other user interface data elements. The method may be performed by a service provider to verify execution of said application on a computer system of a customer. The method may also include generating a report including results of said verification processing. The report may include at least one image graphically illustrating said user interface provided as a result of executing said first portion of instructions, wherein said at least one image is generated as a result of executing an instruction in said second portion The test script may be used to verify one or more tests performed as part of qualification of a device. The device may be an instrument that performs any of liquid chromatography and mass spectrometry, supercritical fluid chromatography, capillary electrophoresis, analog to digital signal conversion and/or transmission, and gas chromatography. The test script may be used to verify first data displayed as a graph using said user interface, said first data being generated by said instrument in connection with performance testing of said instrument. The test script may be used to verify control settings of a device and data acquired using said device.

In accordance with another aspect of the invention is a system comprising: an instrument that performs any of liquid chromatography and mass spectrometry; an application comprising an application server portion and an application client portion; a server in communication with said instrument and executing said application server thereon; a client in communication with said server and executing said application client thereon, said client further including a computer readable medium with code thereon for: receiving a test script including one or more instructions to test said application; emulating a user interaction with a user interface of said application, said emulating including executing a first portion of said one or more instructions in said test script; receiving an output of results related to verification of software used in connection with said instrument, said output including information displayed using said user interface in response to said user interaction; and performing verification processing for said output, said verification processing including executing a second portion of said one or more instructions in said test script, wherein a first instruction in said second portion references a user interface data element and without specifying a complete path for said user data element, wherein said complete path identifies a location of said user interface data element in said user interface.

In accordance with another aspect of the invention is a computer readable medium comprising code thereon for testing an application comprising: receiving a test script including one or more instructions to test an application; emulating a user interaction with a user interface of said application, said emulating including executing a first portion of said one or more instructions in said test script; receiving an output including information displayed using said user interface in response to said user interaction; and performing verification processing for said output, said verification processing including executing a second portion of said one or more instructions in said test script, wherein a first instruction in said test script references a user interface data element without specifying a complete path for said user interface data element, wherein said complete path identifies a location of said user interface data element in said user interface. The test script may be used for administrative operations performed in connection with management of said application by an administrator. The test script may be used in connection with testing security and access to said application. The one or more application settings may be specified using said test script using an administrator login and said test script may test whether proper access and security are provided in accordance with said one or more application settings. A first of said application settings may limit any of access and operations that can be performed by one or more users of said application. The first application setting may limit any of access and operations with respect to a device having its operation controlled using said application.

BRIEF DESCRIPTION OF THE DRAWINGS

Features and advantages of the present invention will become more apparent from the following detailed description of exemplary embodiments thereof taken in conjunction with the accompanying drawings in which:

FIGS. 8, 9 and 10A provide additional detail regarding processing performed by components in connection with techniques herein;

FIGS. 10C and 11A-11I are examples illustrating and describing a report as may be generated in an embodiment in accordance with techniques herein.

DETAILED DESCRIPTION OF EMBODIMENT(S)

Figure 1:
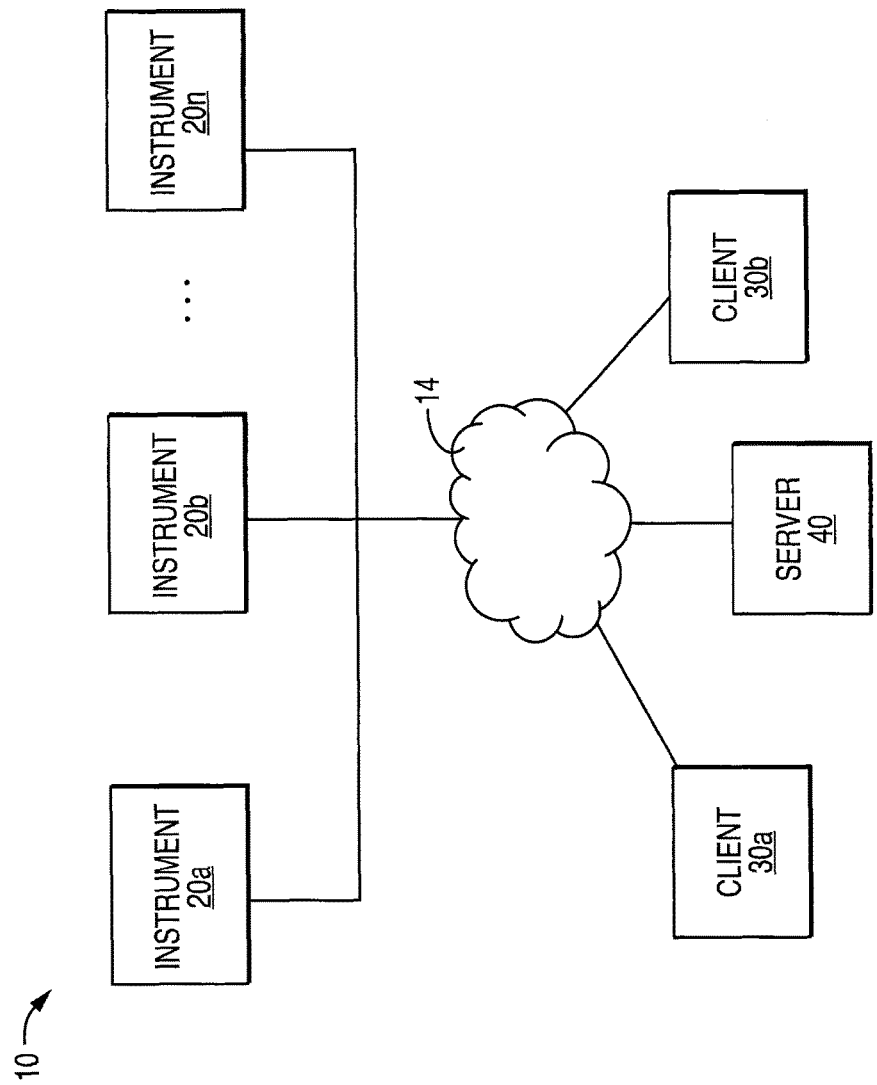
FIG. 1 is an example of an embodiment of a system that may utilize the techniques described herein.

Referring to FIG. 1, shown is an example of an embodiment of a computing environment that may be used in performing the techniques described herein. The computing environment illustrated in FIG. 1 is only one example of a suitable computing environment and is not intended to suggest any limitation as to the scope of use or functionality of the techniques described herein. Those skilled in the art will appreciate that the techniques described herein may be suitable for use with other general purpose and specialized purpose computing environments and configurations. Examples of well known computing systems, environments, and/or configurations include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The techniques set forth herein may be described in the general context of computer-executable instructions, such as program modules, executed by one or more computers or other devices. Generally, program modules include routines, programs, objects, components, data structures, and the like, that perform particular tasks or implement particular abstract data types. Typically the functionality of the program modules may be combined or distributed as desired in various embodiments.

Included in FIG. 1 are instruments 20*a*-20*n*, client computers 30*a*, 30*b*, server computer 40, and a network 14. The client computers 30*a*, 30*b* and server computer 40 may include a standard, commercially-available computer or a special-purpose computer that may be used to execute one or more program modules. Described in more detail elsewhere herein are program modules that may be executed by client computers 30*a*, 30*b* and/or server computer 40 in connection with facilitating software testing such as of an application installed thereon. The computers 30*a*, 30*b* and 40 may operate in a networked environment and communicate with other computers, instruments, and other components not shown in FIG. 1. The instruments 20*a*-20*n* may be scientific instruments such as liquid chromatography systems, supercritical fluid chromatography systems, capillary electrophoresis, gas chromatography systems, mass spectrometers, and other instrumentation types which may perform, for example, analog to digital signal conversion and/or transmission which are connected to the network 14 and in communication with the client computers 30*a*, 30*b* and server computer 40. The other computers may be file capture clients, print capture clients or other computers within the scope of the computerized system illustrated in FIG. 1 or external to it but may be tested using techniques described herein. The instruments 20*a*-20*n* may include, for example, one or more scientific instruments offered by Waters Corporation of Milford, Mass. (or any other supplier).

As will be apparent to those of ordinary skill in the art, the techniques described herein may also be used in an embodiment in which a computer having software thereon being tested runs standalone not connected to a network. For example, the software may execute on a computer system which is directly connected to one or more instruments rather than through a network. Furthermore and more generally, techniques herein may be used in an embodiment to test software executing on a computer, standalone or connected to a network, which may not be associated with any instrumentation. For purposes of illustration, exemplary embodiments may be described which relate to computers used with instruments, such as scientific instruments, but should not be construed as so limited. Furthermore, the testing performed using techniques herein may be for purposes of testing the software alone or as part of various aspects related to computerized system qualification, verification, and validation activities. The foregoing and other aspects and uses of techniques herein are described in more detail in following paragraphs.

The client computers 30a, 30b and server computer 40 may have one or more applications executing thereon for use in connection with the instruments 20a-20n. The testing techniques herein may be used in connection with testing the instruments. Additionally, the techniques herein may also be used in connection with testing the computerized system(s) (e.g., client and/or server systems and software applications thereon such as a data system described below) through instrument communication and diagnostic, control, and data acquisition testing that may occur in connection with those instruments. In one embodiment, the one or more applications may be included in a data system such as Empower™ 3 or UNIFI™ from Waters Corporation of Milford, Mass. The data system may be used in connection with controlling and managing the instruments, providing security by controlling access to activities within the application, as well as the data and devices on the system, performing data processing, custom calculation creation, designing analyses, and reporting, and the like. For example, the data system may include a database and may be used to provide a data-secured environment to store and retrieve data in support of regulated laboratories, using an embedded, relational database, acquire data and control a variety of instruments, perform instrument and software qualification, and the like. An example of data that may be acquired from one of the instruments 20a-20n, where the instrument is a mass spectrometer, is a series of spectra or scans collected over time. As known in the art, a mass-to-charge spectrum is intensity plotted as a function of m/z. Each element, a single mass-to-charge ratio, of a spectrum may be referred to as a channel. Viewing a single channel over time provides a chromatogram for the corresponding mass-to-charge ratio. The generated mass-to-charge spectra or scans can be acquired and recorded on a storage medium such as a hard-disk drive or other storage media accessible to a computer. Typically, a spectrum or chromatogram is recorded as an array of values and may be stored, for example, in a database of the data system on the server 40. The spectra stored on the server 40 may be accessed using one of the client computers 30a, 30b such as for display, subsequent analysis, and the like. In connection with an application such as Empower 3, data such as the foregoing may be stored in a data container or repository, such as a relational database or other storage facility, and remotely shared such as by multiple clients. As another example, the data system may be used in connection with providing settings for the instruments 20a-20n. For example, the data system may be used in connection with setting various parameters of a mass spectrometer and liquid chromatography system and ensuring proper access and control in connection with modifying such settings. The testing techniques herein may be used to test aspects of the instruments and also of the data system which provide for such access and control. In this example, the techniques for testing may be used in connection with security and data processing functions, or more generally, administrative and non-data acquisition functionality provided by the data system. Furthermore, the testing techniques herein may set an instrument's parameters using the data system software and then read back the current instrument settings to verify that the data system software properly set the instrument parameters and also that the instrument, when so set, may operate as expected.

As will be described in more detail in following paragraphs, the techniques herein may be used in connection with performing automated software testing of the data system, or a portion thereof. The techniques herein may be used to confirm correct and proper operation of various aspects of the data system For example, the techniques herein may be used in connection with setting instrument control parameters and then verifying those settings, verifying access, security and control settings of the data system (e.g., verifying that only particular users having appropriate privileges can perform certain operations), processing data (e.g. ensuring that the system correctly performs calculations), creating customized fields within the application, interfacing with other applications, confirming the system's ability to generate and maintain a log of activities that create or update records or system objects, and the like. In connection with instrument qualification, the automated testing techniques herein may be used with software verification activities including but not limited to software installation qualification, software operational qualification and/or performance qualification, commissioning, and the like.

In accordance with some systems and uses, software verification may be generally characterized as by ISO and ASTM as confirmation, through the provision of objective evidence that specified requirements have been fulfilled and a systematic approach to verify that manufacturing systems, acting singly or in combination, are fit for intended use, have been properly installed, and are operating correctly. The foregoing is an "umbrella" term that encompasses all types of approaches to assuring systems are fit for use such as qualification, commissioning and qualification, verification, system validation, or other.

In accordance with other systems and uses, software verification may be characterized as defined by the FDA in the context of its guidance *General Principles of Software Validation* (applicable within the medical device context). In this case, software verification may be characterized as providing objective evidence that the design outputs of a particular phase of the software development life cycle meet all of the specified requirements for that phase. Software verification looks for consistency, completeness, and correctness of the software and its supporting documentation, as it is being developed, and provides support for a subsequent conclusion that software is validated. Software testing is one of many verification activities intended to confirm that software development output meets its input requirements. Other verification activities include various static and dynamic analyses, code and document inspections, walk-throughs, and other techniques. Software validation is specifically defined by the FDA within its guidance for the validation of software within the medical device context as "confirmation by examination and provision of objective evidence that software specifications conform to user needs and intended uses, and that the particular requirements implemented through software can be consistently fulfilled."

Qualification may be generally be described as an action of proving and documenting that equipment or ancillary systems are properly installed, work correctly, and actually lead to the manufacturer's expected results. Qualification can be a subset of validation, but the individual qualification steps alone may not satisfy the validation requirement of establishing fit for intended use. Validation may be described as confirmation by examination and provision of objective evidence that the particular requirement for a specific intended use can be consistently fulfilled. In this case, processing is performed to validate the proper functionality of specific software operational features by automatically exercising those features in the software and collecting objective evidence of the result, effect or output.

Installation qualification (IQ) is defined by the FDA in their glossary of computer systems software development terminology glossary as establishing confidence that process equipment and ancillary systems are compliant with appropriate codes and approved design intentions, and that manufacturer's recommendations are suitably considered. The techniques herein may be used in connection with verifying and/or documenting that a computerized system is installed according to written and pre-approved specifications. As an example for a chromatography system or instrument, IQ establishes that the system is received as designed, is installed properly, and verifies where the system is installed is appropriate according to the manufacturer's specifications.

Operational qualification (OQ) is defined by the FDA in their glossary of computer systems software development terminology glossary as establishing confidence that process equipment and sub-systems are capable of consistently operating within established limits and tolerances.

The techniques herein may be used in connection with verifying and/or documenting that a computerized system operates according to written and pre-approved specifications throughout specified operating ranges. As an example for a chromatography system or instrument, OQ ensures that key components or primary functionality thereof is operational according to operational specifications in the selected environment which may include its role within an integrated system. For example, security functionality facilitating compliance with 21 CFR Part 11 electronic records and signature regulation requirements can be challenged using automated test software and the results and outputs of such tests collected as documented evidence of correct operation of this functionality within the specific environment of the deployment.

Performance qualification (PQ) for software (such as a Chromatography Data System or like data collection and/or organization system) may be defined as establishing documented evidence through appropriate testing and collection of objective evidence that the processes carried out by the integrated computerized system consistently perform as expected for the intended use. For example, the specific implementation of the process for ensuring a computerized system's security can be in whole or in part challenged using automated test software and the results and outputs of such tests collected as documented evidence of suitability for this intended use. The techniques herein may be used in connection with verifying and/or documenting that a computerized system is capable of performing or controlling the activities of the process it is required to perform, according to written and pre-approved specifications, while in its specified operating environment.

Qualification of instruments, or instrument systems, is described in more detail, for example, in U.S. Pat. No. 6,456,955, Andrews et al. Automated Test Protocol, Issued Sep. 24, 2002, which is incorporated by reference herein.

The foregoing, as well as other exemplary uses of the techniques herein, are described in more detail in following paragraphs and figures.

It will be appreciated by those skilled in the art that although components of the system of FIG. 1 are shown in the example as communicating in a networked environment, the components may communicate with each other and/or other components utilizing different communication mediums and may or may not be networked together. For example, the components of FIG. 1 may communicate with each other and/or one or more components utilizing a network connection, and/or other type of link known in the art including, but not limited to, the Internet, an intranet, or other wireless and/or hardwired connection(s). Furthermore, as noted above, the techniques herein may be used in an embodiment with standalone computers operating autonomously with or without network connectivity.

Figure 2:
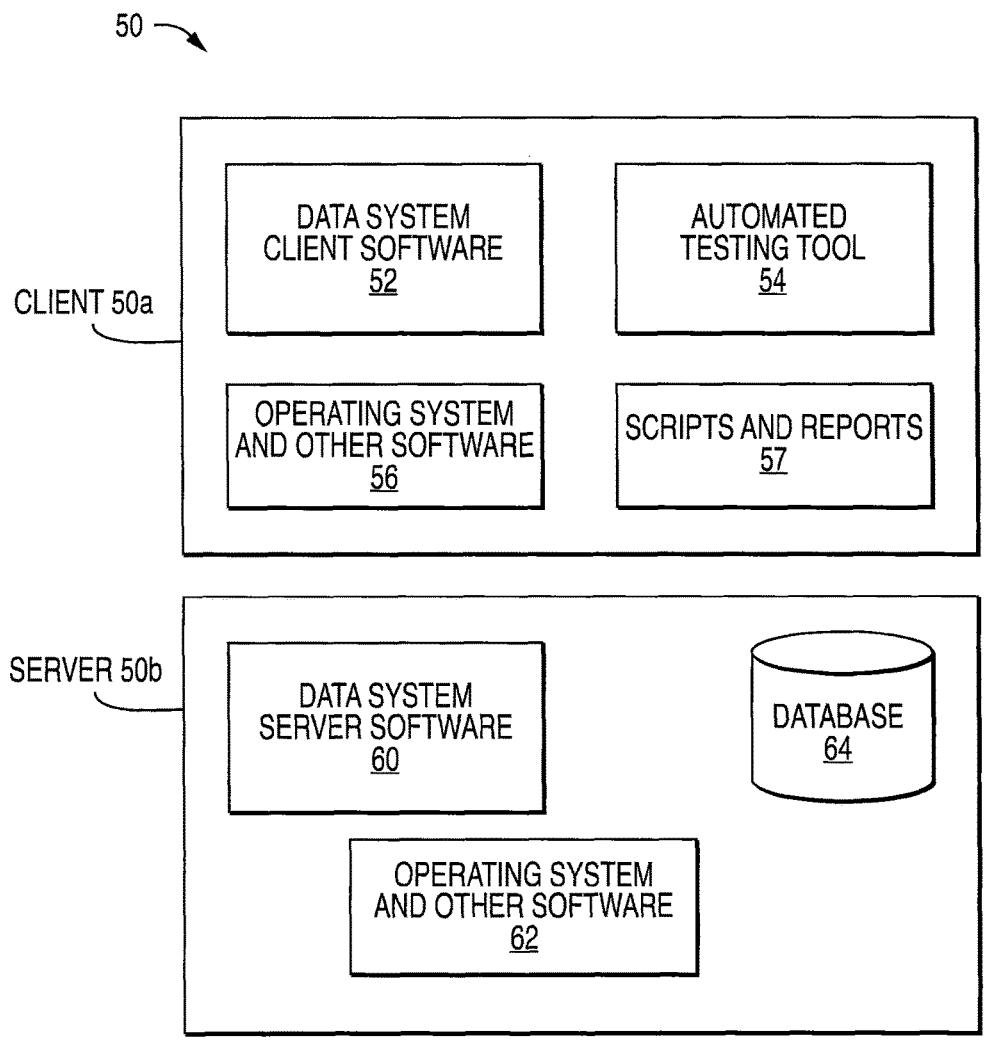
FIG. 2 is an example of components that may be included in a client and a server in an embodiment in accordance with techniques herein.

Referring now to FIG. 2, shown is an example of components that may be included in a client computer and a server computer in an embodiment in accordance with techniques herein. The client computer 50a may include data system client software 52, an automated testing tool 57, scripts and reports 57, and operating system and other software 56. The data system client software 52 may be, for example, the client portion of the data system described above to control and manage the instruments. In one embodiment, the client may be characterized as a thin client or a fat client. With the thin client, a majority of the application's functionality is performed by software included on the server 50b. In contrast, a thick or fat client is one in which a large portion of the application's functionality is performed by or embodied in the client software 52. The particular partitioning of functions performed by the client and server may vary with application. Element 57 represents scripts and reports, and possibly other inputs and outputs used by or generated by the automated testing tool 54. The automated testing tool 54 may use scripts to perform automated testing of the client software 52 of the application, or more generally automated testing of the application as accessed from the client or other portion of the computerized system. As an output of performing testing using the scripts, the tool 54 may generate reports which are illustrated in this example as residing on the client. In some embodiments of the techniques herein, a testing script of 57 may include commands which drive or control a testing session and execution of the tool 54. This is described in more detail in following paragraphs. Element 56 represents the operating system and possibly other software that may be on the client computer 50a. The operating system may be any one of a variety of commercially available or proprietary operating system such as, for example, a Windows-based operating system by Microsoft Corporation.

The server computer 50b may include data system server software, a database 64, and operating system and other software 62.

Although not illustrated in FIG. 2, each of the client 50a and server 50b computers may include one or more processing units, memory, a network interface unit, storage, and the like. Depending on the configuration and type of computer, the memory thereof may be volatile (such as RAM), non-volatile (such as ROM, flash memory, etc.) or some combination of the two. The storage may include removable and/or non-removable storage for use with computer system including, but not limited to, USB devices, magnetic or optical disks, or tape. Such storage devices have associated computer-readable media that may be utilized by the computer and may include, for example, a hard disk or CD-ROM drive, that can be accessed by the computer. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by the computer. Each of the computers may also contain communications connection(s) to facilitate communication with other devices and components such as, by way of example, input devices and output devices. Input devices may include, for example, a keyboard, mouse, pen, voice input device, touch input device, barcode reader, etc. Output device(s) may include, for example, a display, speakers, printer, and the like. These and other devices are well known in the art.

As mentioned above, the data system client software 52 and server software 60 may comprise a data system or application used in connection with the instruments of FIG. 1. For example, such software may be used in controlling operations of a liquid chromatography system or mass spectrometer, set instrument parameters used to operate the instruments, collect and store data such as results of analysis performed by the instruments, and the like. The application such as the data system may be used to manage system security of the instruments, securely provide for storing data that is used and generated by the instruments, control access to such data and the actions within the application with respect to users in accordance with roles, permissions, and the like. In one embodiment, the testing tool 54 and scripts may be co installed on the client 50a with the installation of the data system client software 52.

In one embodiment in accordance with techniques herein, the tool 54 may be used in connection with automating testing of the client software of the application 52 by executing testing scripts. It should be noted that the testing performed in accordance with techniques herein may be more generally described in following paragraphs as testing the application. The scripts may be used to test functionality of various aspects of the application and its use in connection with the instruments. For example, the testing techniques herein may be used to test and verify that the application provides proper access, control and security to data or instruments in accordance with various and differing levels of privileges and access that may be provided to different users, roles, permissions, and the like. The testing techniques herein may also be used, for example, to verify that when the application is used to set an instrument's operational parameter that such setting is actually and properly performed, to verify that data generated as a result of operating the instrument is as expected (e.g., such as part of PQ for the instrument), and the like. The testing tool, scripts and techniques herein may be used to qualify or verify the application itself, its installation, and the like. The tool may be used to automatically test the application to make certain it is functioning correctly in its currently installed environment. For example, an embodiment of the tool may use software automation technology to execute detailed operational and performance tests, gather evidence of the test execution (e.g., screen images, actions, messages) and determine success or failure/error of the test. The techniques herein may log and reports these pieces of information.

The tool may perform testing techniques herein to emulate manual user interactions with the application through test automation, such as emulate user interactions with a graphical user interface (GUI) causing generation of menu selections without having the user manually perform such selections. Rather, such emulated user actions and further processing and analysis of the results of such user interactions may be performed in an automated fashion using techniques herein by the tool 54 executing a script. In this way, the tool uses the software user interface of the application and conducts the actions that a user would. In one embodiment in accordance with techniques herein, the tool may accept input information and make data entries in fields as a user would. The tool may configure the application and test such configuration settings. For example, the application's security settings and other configured parameters may be specified and then verified by testing performed by the tool in an automated way in the application's operating environment.

It should be noted that each client computer of the system may include components similar to that as described and illustrated in connection with FIG. 2.

Figure 3:
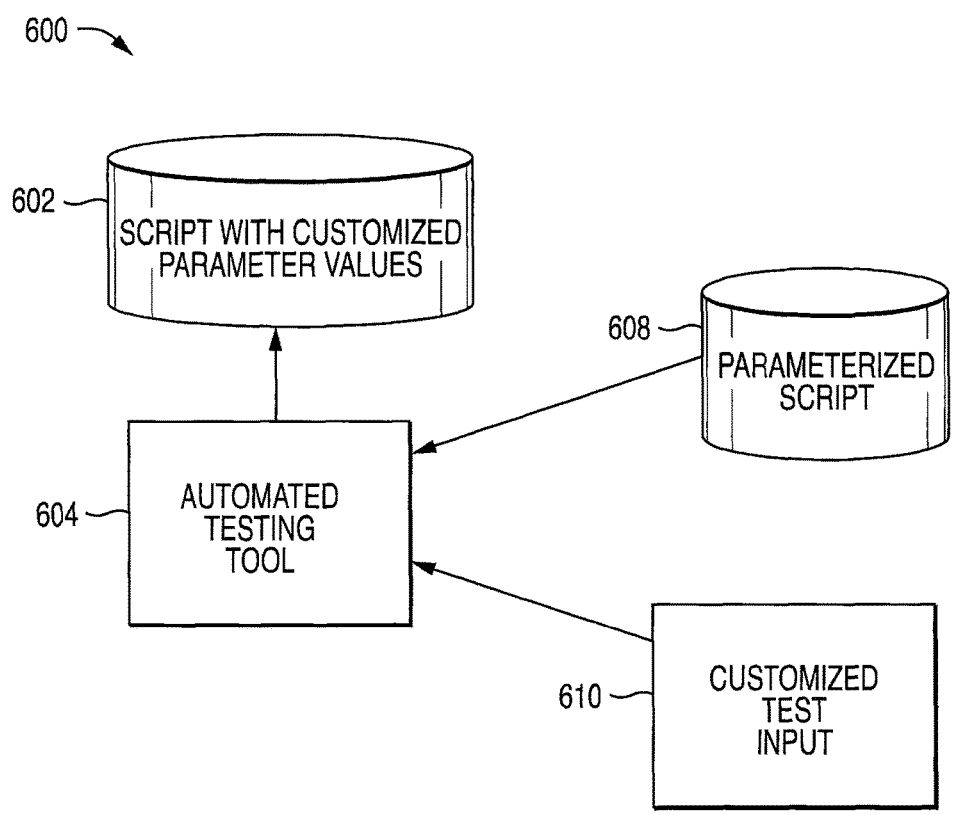
FIGS. 3 and 4 illustrate flow of data and interaction between components in an embodiment in accordance with techniques herein.

Referring to FIG. 3, shown is an example 600 providing additional detail regarding operational flow of components and data in connection with techniques herein. The example 600 illustrates use of the testing tool as may be included on a client computer. In one embodiment, the scripts may be parameterized providing for customization for each testing site or system. For example, as will be described in following paragraphs, the parameterized script 608 may include a parameter used in testing, such as a user account or identifier, configurable system parameter, and the like. A value may be specified for the parameter in the customized test input 610. The tool 604 may take as inputs the parameterized script 608 and customized test inputs 610, make appropriate substitutions of the values provided for the different parameters, and generate a script with customized parameter values 602. It should be noted that the parameterized script 608 may be characterized as a template customized for use with different inputs 610 to generate scripts represented by 602. The scripts which may be executed by the tool 604 may be those represented by 602. The data flow and operation described and illustrated in FIG. 3 may be performed as part of a first step in an embodiment in accordance with techniques herein to generate the scripts of 602 which are used in subsequent testing.

Figure 4:
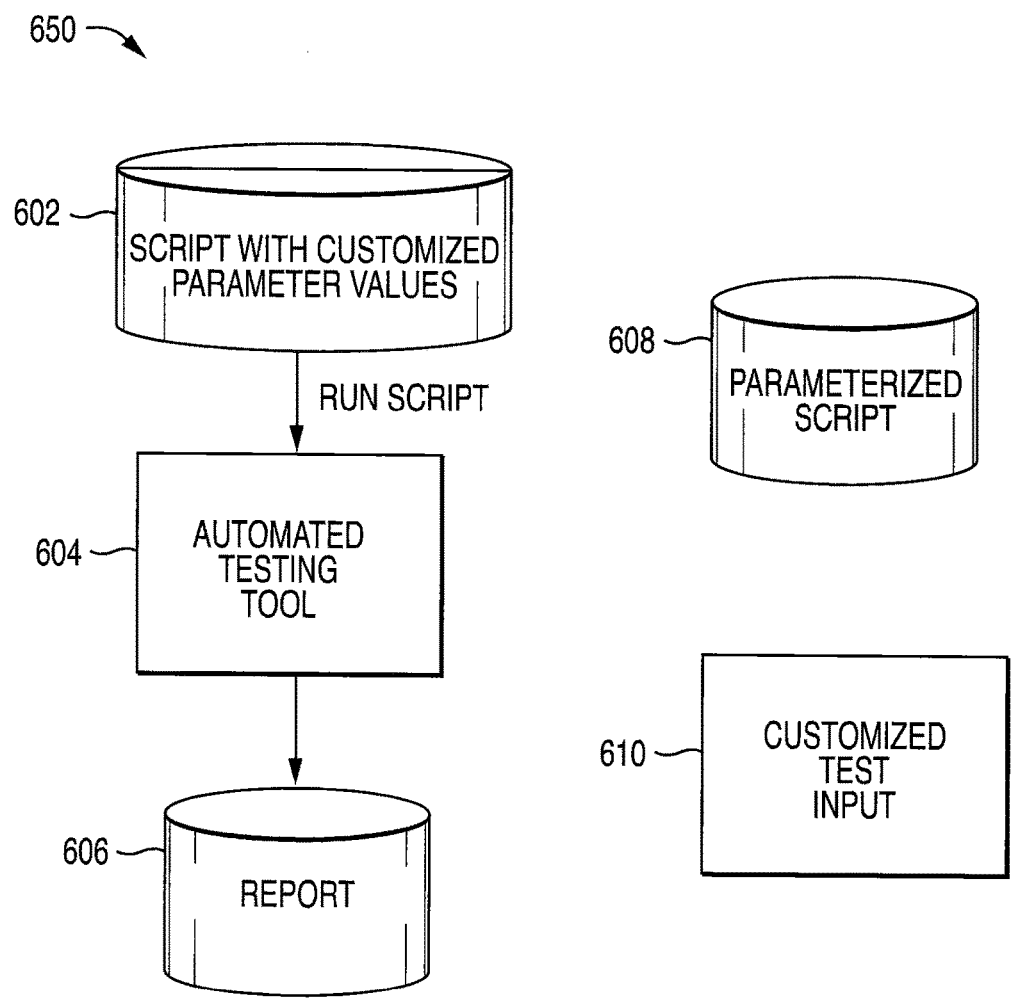

Referring to FIG. 4, shown is an example 650 illustrating operational flow of components and data in connection with executing the tool to perform automated testing in accordance with techniques herein. The example 650 may be performed subsequent to the processing of FIG. 3 and illustrates the tool 604 taking as input the script 602 having the customized parameter values. The tool 604 may interact with other components of the system such as the database, instrument, and the like, in connection with testing and may generate a report 606 regarding the results of such testing. As described herein, the testing tool may be used to execute a script of 602 which emulates, or more generally, automates user interactions with the user interface of the application for testing or other purposes. For example, the tool may be used to automatically logon as an chemist having assigned privileges suitable to their role, setting instrument control parameters, creating analyses, operating instrumentation, examining results of operating the instrument, and the like. For example the tool may be used to automate testing of logging in as an administrator with elevated privileges able to perform management of the application with respect to other user of the system and application and testing such as, for example, create new user accounts, change or set options of user accounts, modify system settings (e.g., timeout for application logins), and the like. The foregoing may be performed by a user interacting with the application using a GUI and may be generated through automation techniques using the testing tool and script in an embodiment herein. The tool executing a script may be used to perform a user action through the GUI, obtain data generated as a result of that action where such data may be displayed using the GUI, and verify that the resultant data generated is correct or as expected.

In connection with illustrating techniques herein, exemplary script syntax, exemplary uses, and other details may be provided herein. However, it will be appreciated by those of ordinary skill in the art that the techniques herein have broader applicability and the details provided herein should not be construed as a limitation.

As an example to illustrate the parameterized script providing script customization, consider an example of a test script including commands to test setting a configuration option of the application. For example, the test script may include commands to set and test the timeout value for the application. The application timeout value may specify an amount of time after which a user currently logged into the application is logged out, results in invocation of screen saver, or some other suitable action. The timeout value may be a configurable value represented as a script parameter. A customer using the application for which testing is being performed may enter a value for the timeout as an input for use with the testing script. The following may represent statements included in such a testing script:

```
1    Set timeout = t$
2    <wait t$>
3    attempt application use
4    if message box exists
5         verify message of message box = "timeout message"
```

With respect to the above script, statement 1 may represent setting the timeout value to the parameter t$. The customer may specify a value for t$ as a test input in connection with FIG. 3 processing to generate a customized script. At a later point, the customized scrip is executed as described in connection with FIG. 4. When the statement 1 is executed, the testing variable timeout is set to the user or customer provided input. Statement 2, when executed, causes the testing tool to wait the amount of time, such as a number of seconds, indicated by the current value of t$. Statement , when executed, tests whether the message box having the expected "timeout message" is displayed after waiting the amount of time indicated by t$.

It should be noted that the test inputs may be provided, for example, by a user through a GUI. Such inputs may also be processed to ensure data integrity of the values. For example, input value checking may be performed to confirm whether test input data received is of a required type such as all numeric, has a required format such as a date format, is within an expected range of values, and the like. An embodiment may also provide a set of default values for any such parameters of the script which may be overridden by any user provided values.

Figure 5:
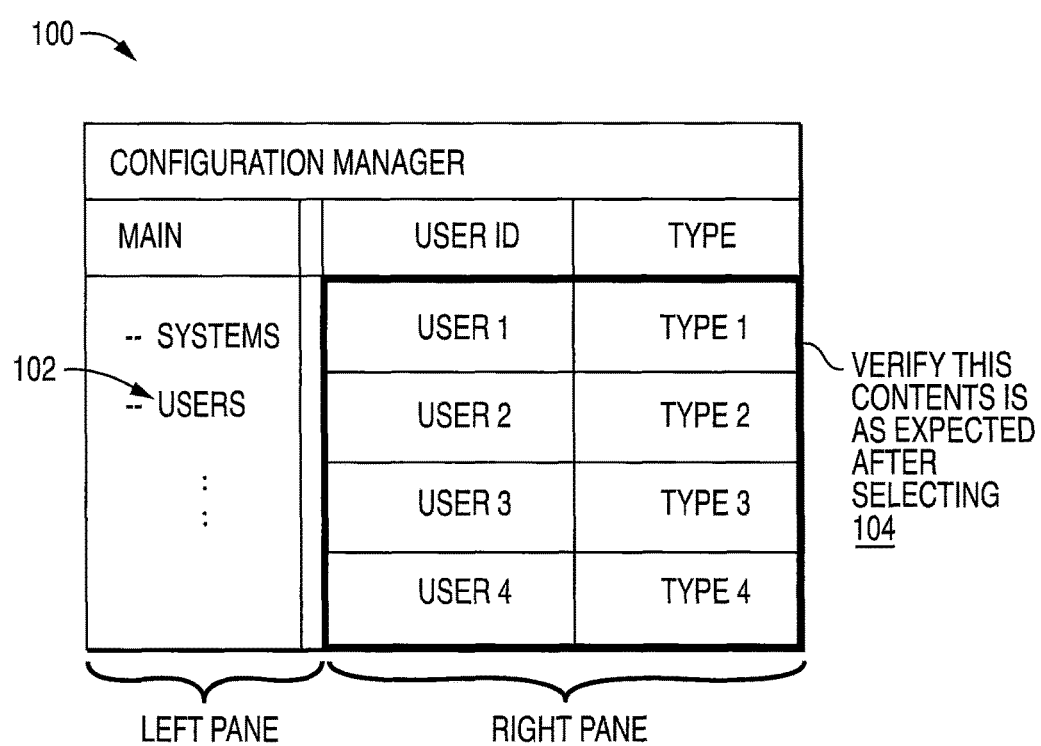
FIG. 5 illustrates a user interface display that may be used in connection with techniques herein.

Referring to FIG. 5, shown is an example of a screenshot that may be displayed via a GUI using the application in connection with which testing is being performed. The example 100 shows a configuration manager window that may be displayed, for example, in connection with an administrator performing application management operations for user accounts. The window may include a left pane and right pane representing a partitioning of the window. A selection of 102 from the menu may be made to view current user accounts of the application. In response to selecting 102, information 104 may be displayed in the right pane of the window in tabular or other form. The testing tool and script may be used in connection with techniques herein to verify that the contents of 104 includes one or more items of expected data. For example, it may be that there should not be more than a threshold number of administrator accounts where an administrator may be represented as having a particular User ID and/or type. More generally, testing may be performed to verify the contents or data of the right pane generated as a result of selecting a menu item in the left pane. A location of an item in a window may be identified by specifying a window identifier, a pane, an area within the pane, and an item or element within the area. More generally, the location of the item may be represented as:

(window ID.pane ID.area ID.item ID)

The window ID may be an identifier uniquely identifying the window, such as for the configuration manager of the example 100. The pane ID may be an identifier uniquely identifying a pane within each window where each window may be partitioned into one or more panes. For example with reference to FIG. 3, a first pane ID may be used to identify the left pane and a second pane ID may be used to identify the right pane. The same such pane IDs may be used with each window and may be predefined key words, such as RIGHT and LEFT to denote, respectively, the right and left panes. Each pane may be further divided into one or more areas each having own identifier to uniquely identify an area within each pane. For example with reference to FIG. 5, the right pane may have only a single area and may include only a single item. The entire table of data 104 may be a single item although an embodiment may also provide for referencing a single cell or element of the table as an item.

It should be noted that each of the different identifiers used to identify a location of an item within a window may be implemented in a variety of different ways. For example, an embodiment may use predefined keywords to represent pane IDs, and area IDs for all windows. The windows ID may be an identifier used by the operating system to identify the particular window. The item ID may be an identifier associated with the particular item. The item's identifier may be an identifier used by the application to refer to particular item with respect to the GUI data. The item identifier may be determined, for example, based on a displayed menu string, specified by a developer of the application where the same item ID is then used by the developer in writing the test scripts, and the like. Each window, pane, area and item may be more generally referred to as a data element of the GUI. In one embodiment, the item identifier, as well as other tags or identifiers associated with a particular window, pane and/or area, may be managed and specified by the application to uniquely identify each such data element within the GUI. For example, the application may refer to the table of data 104 using a unique named item ID. The application may associate the item ID with the data 104 and provide the data 104 and item ID to the GUI in response to selecting 102. As such, an embodiment in accordance with techniques herein may also use such an item ID within the test script to identify the particular data item generated in response to selecting 102. In this way, the identifier used to reference a GUI data element in a test script is independent of changes that may occur using other techniques to generate and manage data element GUI identifiers. For example, an embodiment may generate UI data element tags or IDs based on strings, menu item text descriptions, or other information provided for display on the GUI. In this case, as the string or other GUI content displayed changes, such as may vary with language (e.g., French, English, German, Chinese etc.), character set, simple alphabetic case changes, etc, the testing script may have to be modified to reference the different data element identifiers that also vary with such changes. Use of unique identifiers managed by the application, where such identifiers are not determined from GUI data displayed, provides for identifying data elements of the GUI in a manner independent of changes to such displayed data (e.g. changes to character set, language, and the like).

It should be noted that a data item may generally refer to any element displayed in connection with a user interface such as, for example, a list, a table, a single cell or item of a table, a column of data, a row of data, information such as text included in, or otherwise associated with, a dialogue box, a radio button, and the like.

Figure 6:
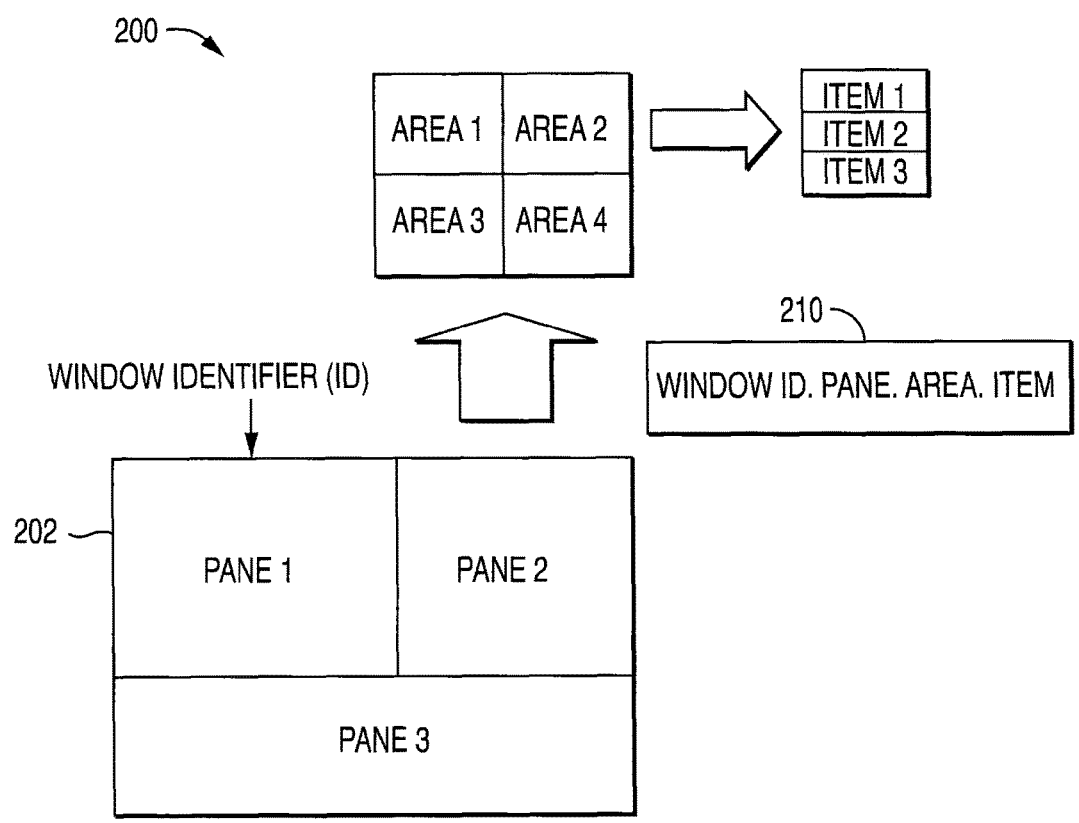
FIGS. 6 and 7 illustrate a hierarchical representation regarding location of a data element in a user interface.

Referring to FIG. 6, shown is an example illustrating more generally how a data item may be identified within a GUI in an embodiment in accordance with techniques herein. The example 200 includes a window ID used to identify a particular window. The window 202 may be partitioned into one or more panes. In this example 200, there are three panes. Each such pane, such as pane 2, may be further divided into one or more areas. In the example 200, pane 2 may include 4 areas. Each area, such as area 2, may include one or more data items. In the example 200, area 2 is illustrated as include 3 items. Element 210 represents the general format using one syntax that may be used to specify an item having a particular location in the GUI displayed. Element 210 may be syntax used in a test script to refer to a particular data item and used to obtain or reference a data item having a value to be tested using the testing tool and script.

As described above and represented by element 210 of FIG. 6, a data item may be identified as having a location specified using a path identifier where the path identifier corresponds to location of the data item within the window. Although a particular number of areas and panes may be illustrated, an embodiment may have any number. Also, although each path identifier is illustrated in 210 as including four levels of data element identifiers, an embodiment may provide for any number of levels in connection with a path identifier associated with a data item.

Figure 7:
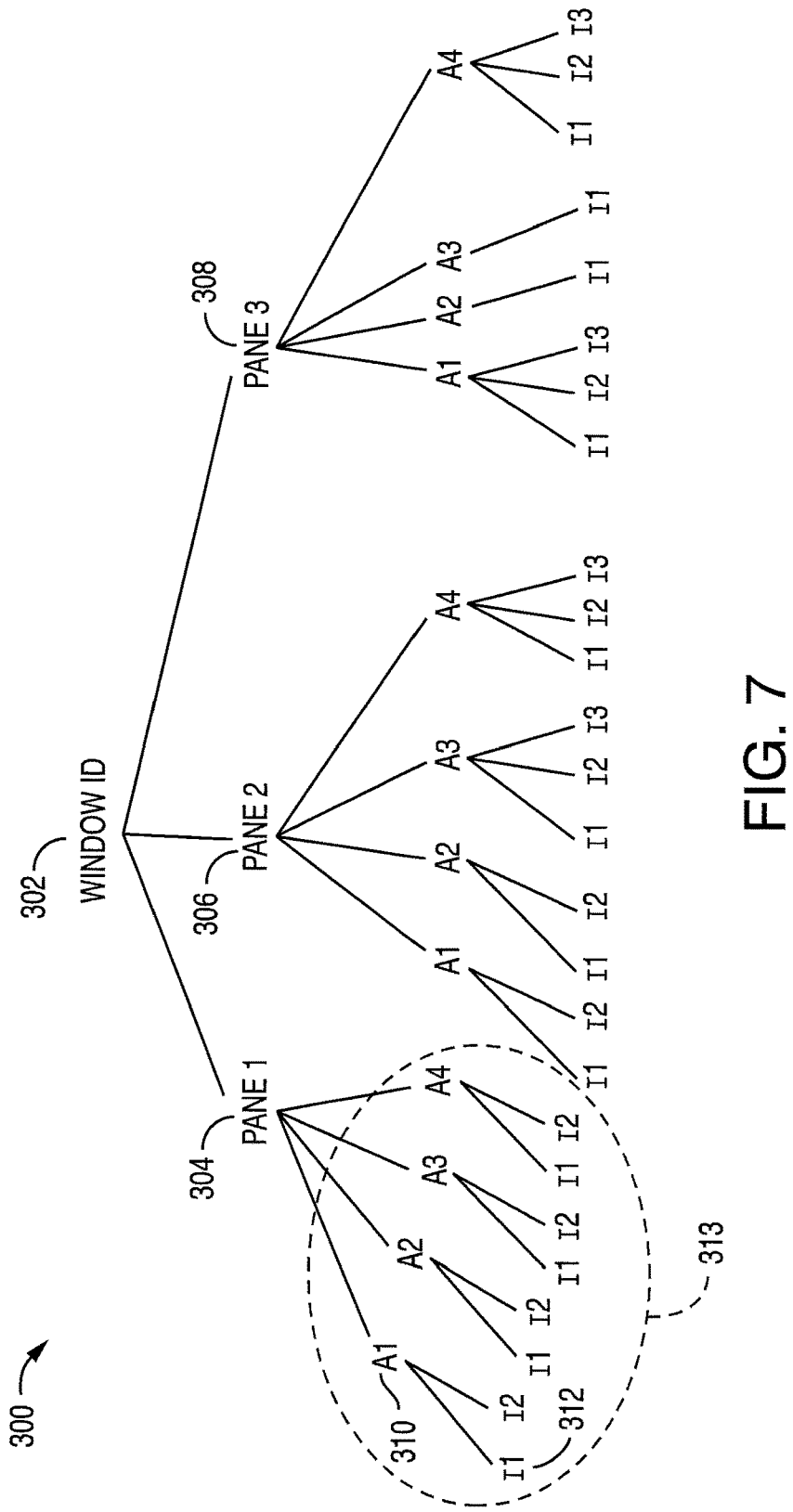

Referring to FIG. 7, shown is a representation of different GUI data elements within a window as a hierarchy of levels. The example 300 is a tree representation having a plurality of levels corresponding to the number of levels in the path identifier for a data item. Each data element (e.g., window, pane, area or item) within the tree structure may be represented as having a path from the tree root denoted by the window ID 302. The tree of 300 includes four levels corresponding to window, pane, area, and item. The tree includes a first or top level at the root denoted by the window ID 302. Each pane is located as a node in the second level of the tree such as pane 1 304. Each area is located as a node in the third level of the tree such as A1 310. Each item is located as a node in the fourth level of the tree such as I1 312. The tree has leaves at the bottom level, level 4 in this example. A location of any node in the tree, and thus within the GUI, may be specified using a path originating with the root. A complete path may refer to a path associated with a data item at the fourth level or bottom most level of the tree. A partial path with respect to any data element may refer to specifying less than the complete path enabling locating the particular node in the tree representing the data element. More generally, if any data element in the path is omitted, the path may be referred to as a partial path. For example, the complete path for I1 312 is "Window ID.Pane 1. A1.I1" enabling identification of 312 within the tree (e.g., the particular path from the root 302 to the node corresponding to the item 312). A partial path for item 312 may be specified using syntax indicated the omitted level or levels within the path. For example, one or more levels omitted from the path may be indicated using "*" in the following as "Window ID.Pane 1.*.I1" In this case, only a portion of the path for 312 I1 has been specified in that a subtree or portion 313 has been specified as including the item 312. In other words, the above representation of a partial path omits specifying the area or level 3 identifier for a node in the tree and represents that the data item I1 may be located in any area of the window.

It should be noted that the tree for each window may be included in a larger system hierarchical representation for all windows in a system.

In connection with test scripts referencing a particular data item having a particular location in a window, a problem or complication may exist for testing if the data item's location changes. Such changes with respect to a data item in a GUI may be common. In connection with testing scripts, the testing script may require modification to accommodate such changes when a data item is relocated to a different area, or pane within a same window. An embodiment in accordance with techniques herein may use a scripting language which automatically adapts when an item is relocated within a window without having to rewrite or modify the testing script. In connection with techniques herein when referencing an item, the item may be identified or referenced in the testing script using syntax which provides for a varying number of levels in the windows identification hierarchy as described above. A data item may identified using a complete path or a partial path. When a complete path is specified, the testing tool may look for the data item only at the one location within the GUI denoted. If a partial path is specified, the testing tool may look for the data item at any one or more of the possible locations represented. For example, with reference to "Window ID.Pane 1.*.I1", as noted above, this may represent a partial path where the area or level 3 identifier is omitted for a node in the tree and represents that the data item I1 may be located in any area of the window. In connection with partial paths, the testing tool may look or search for item I1 in any area of the window. Thus, if the location of I1 moves between areas within the same window, the script referencing I1 using the foregoing partial path will not require modification. With reference back to FIG. 7, use of the foregoing partial path results in the testing tool processing the script and looking for I1 as a leaf node anywhere in the subtree 313. In connection with use of a partial path in a testing script to identify a data item, if a portion of the path changes which has been omitted from the partial path specification, the data item reference will still be correct.

With partial path specification the test script may generally use a nesting level to represent location of item or more generally any GUI data element. A partial path for a data item may be specified by omitting one or more levels of intervening nodes in path between the window ID and item. The omitted nodes or levels may be denoted in the syntax of the script language using one or more characters (e.g., "*" as above). Specifying a partial path where only the root and leaf node of the item are specified such as:

Window ID.*.item ID causes the tool to search for the item any where in the entire window or tree as represented in FIG. 7. Specifying one or more intervening levels between the root and leaf node provides for limiting the tools' search for the item within a portion of the hierarchy associated with the window and GUI data elements.

The foregoing is only one exemplary syntax that may be included in a scripting language in an embodiment in accordance with techniques herein. As another example, an embodiment may use syntax providing for complete or partial path specification using keywords as:

Window ID=ID, Pane=P1, item=item1 which allows for specifying the pane but not the particular area.

By specifying a partial or complete path, the script developer effectively specifies search criteria or constraints which limit the searching performed by the tool to locate and obtain a data item. For example, with reference back to FIG. 5, the user information 104 displayed in response to selecting 102 may never be relocated or moved to a particular portion of the GUI and use of partial path specification provides flexibility in identifying the data item but also limiting the search or possible locations within the window where the data item may be found. An embodiment may also provide for specifying searching criteria in connection with determining a single data item, a group of data items, or any data item using other syntax. For example, an embodiment may include script syntax to specify negative search criteria identifying portions of hierarchy or window NOT to search when looking for the item. Exemplary syntax for criteria or constraints may be:

EXCLUDE (Pane =PANE1; Area =A2).

which indicates not to search for a data item in PANE1 or AREA 2.

As noted above, although a particular application and system are described herein, the testing techniques may generally be used with testing any user interface with any application to emulate manual user interactions and verify results as may be displayed using a GUI.

The techniques herein may be used to test system or application management, security, access, data integrity, verify data processing or workflows such as to test the actions involved in processing of data and confirm recording of date and time of operator entries and actions that create, modify, or delete electronic records. For example, the techniques herein may be used to automate the testing of audit trail functionality. As another example, the techniques herein may be used to verify data such as run data generated by an instrument. For example, the techniques herein may be used to automate qualification of instruments.

For example, the script may include commands to operate an instrument performing or emulating liquid chromatography or mass spectrometry resulting in generation of data or emulated data. The data may be for a chromatogram or emulated chromatogram which is plotted on a GUI display as a graph from a series of X,Y coordinates in 2-dimensions. The chromatogram's data may be identified as a data item which is displayed in graphical form in the GUI display. The data may be stored in a table or array having two columns, an X column for the X coordinates of the data points, and a Y column for the Y coordinates of the data points. The test script may include statements to retrieve the table of data and further process the data as part of the test script.

Figure 8:
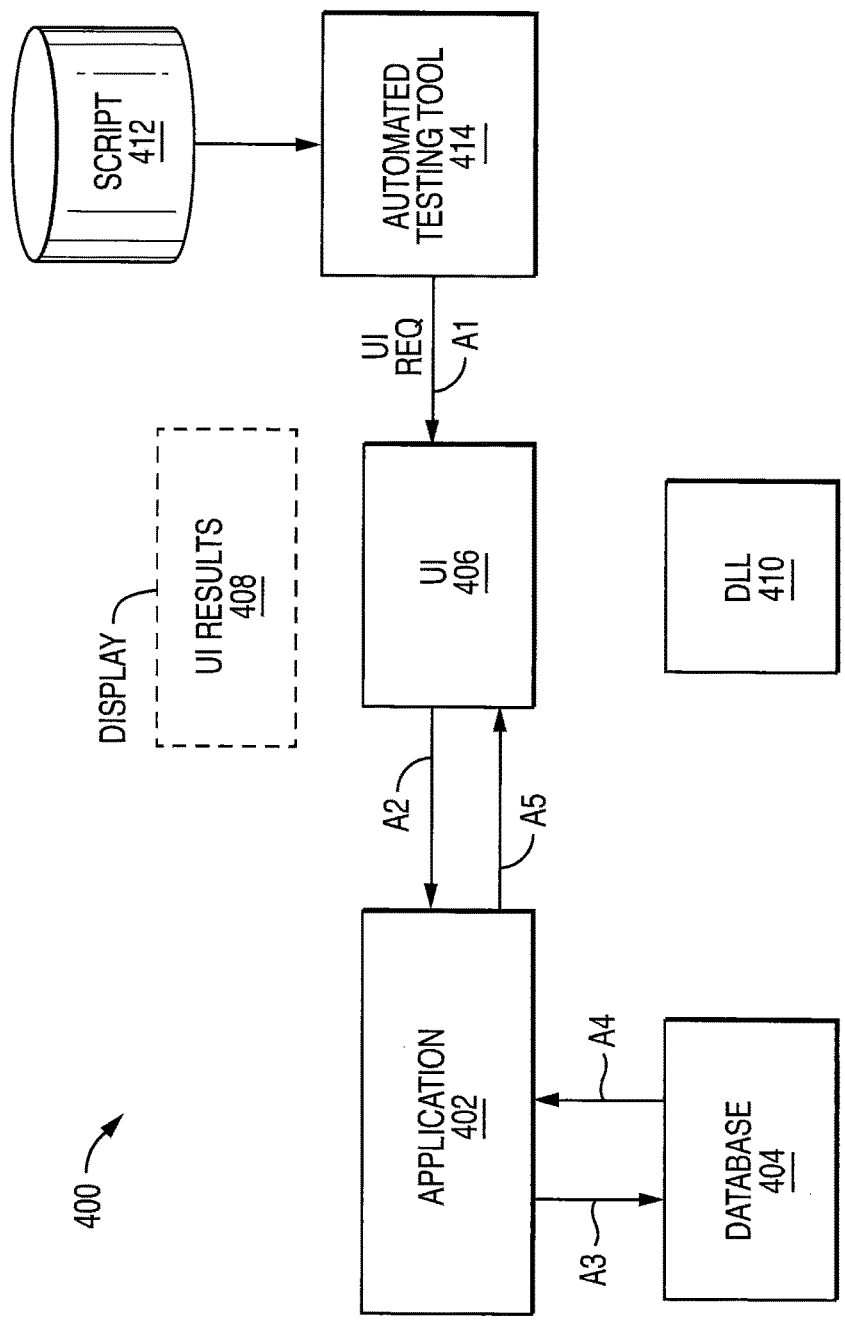

What will now be described is processing performed by the tool in connection with techniques herein. Referring to FIG. 8, shown is an example 400 including an application 402, database 404, UI 406, tool 414, script 412, DLL or more generally a library or code module 410, and UI results 408. The elements 402 and 404 may collectively represent components located on the client and servers for a given data system. For example, the database 404 may be used to store data for the system as described herein using the application 402 to manage and control the instruments of FIG. 1. The testing techniques may be used to perform automated testing of the application 402 as well as in connection with the use of the application for aspects of instrument qualification. It is assumed that the script 412 includes the customized script with any customized test inputs. In operation, the tool 414 executes one or more statements of the script 412 resulting in issuing a UI request A1 representing a emulating manual user interaction with the UI 406. For example, A1 may represent a user selection from a menu. Following A1, A2 is performed which represents a request from the UI 406 to the application 402 for the data in response to the menu selection. The application 402 may access the database 404 (step A3) to retrieve data, metadata, and other information in connection with responding to the user requests via the menu selection. Information returned to the application 402 is represented by A4. The application then sends A5 the requested data to the UI 406. For example, with reference back to FIG. 5, the emulated user action may be selection of 102. In response, the data returned to the UI 406 may be the information of 104 (which is denoted in FIG. 8 as UI results 408 as may be displayed on a screen or other UI output device).

Figure 10A:
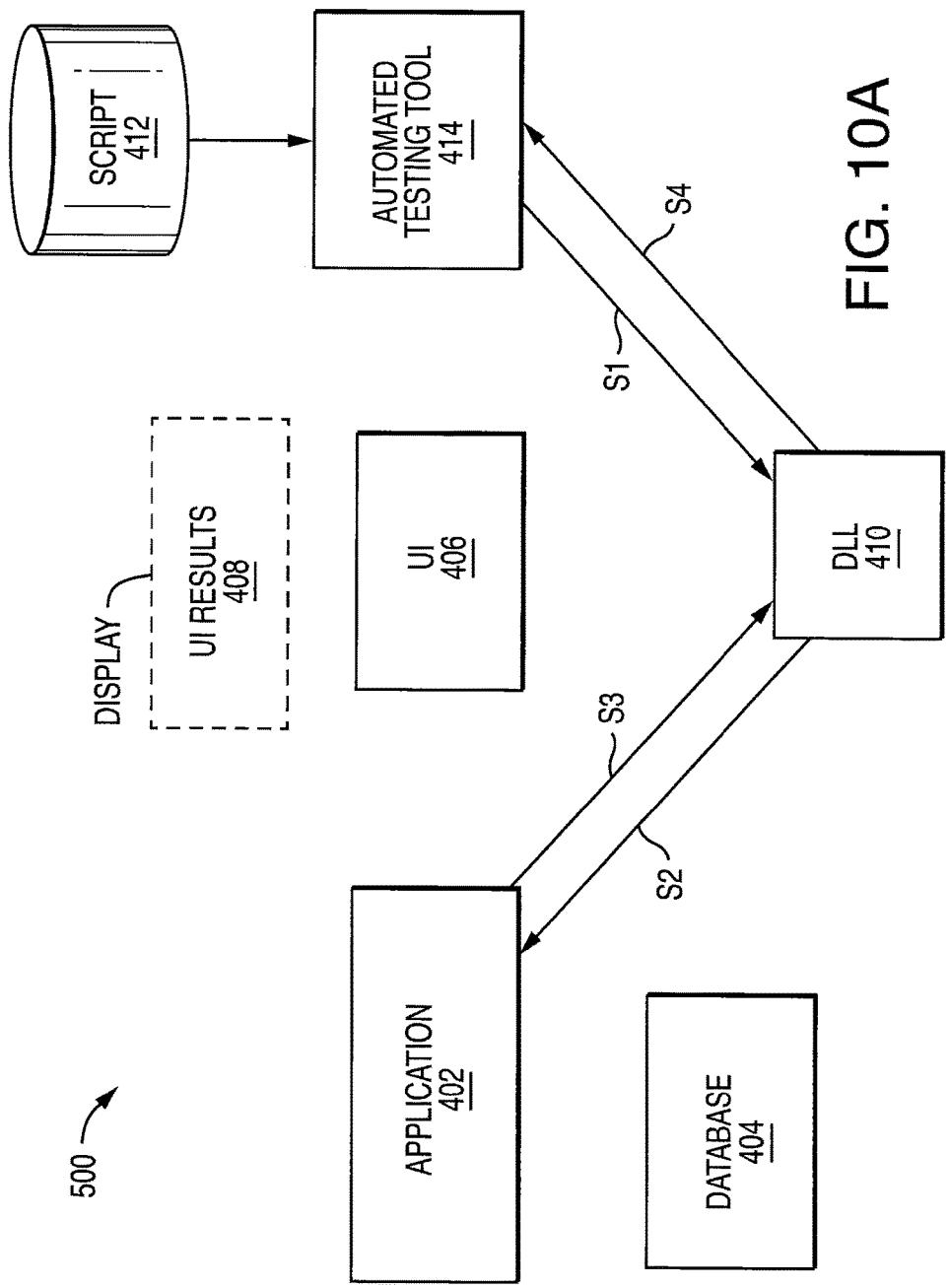

The testing tool 414 may then perform subsequent processing to obtain the data or UI results. In other words, FIG. 8 represents emulation of the user interaction or request through automated testing techniques which result in data or UI results 408 being sent to the UI 406. In a second set of processing steps with reference to FIG. 9, the tool 414 now performs processing to obtain the data or UI results. The tool 414 may then issue a request to the UI 406 to obtain a handle or pointer to the UI results or data. The handle may be characterized as a pointer or identifier of the desired data item. The handle may represent, for example, an address of the data item as used by the UI 406. The handle H1 may be returned to the tool 414. At this point, the tool 414 does not have the data item itself but only its handle H1. In a third set of processing steps with reference to FIG. 10A, the tool 414 communicates with the DLL 410 in step S1 requesting that the DLL obtain the data item. Step S1 may include using an API (application programming interface) which includes as parameters the handle H1 and data item, such as the complete path identifier for the data item. As noted above, the data item may be, for example, a table of data referenced by a unique identifier where the identifier may be an identifier or tag managed and referred to by the application. The DLL then communicates with the application 402 to request S2 and obtain S3 the desired data. The DLL 410 may then perform any processing needed to the data returned by the UI 406 to place in a format expected by the tool 414. In this way, the tool 414 may leverage the DLL to communicate with the UI 406 to obtain the desired data. The DLL insulates the testing tool 414, for example, from any changes to the format in data returned by the UI 406. Additionally, the DLL 410 may be used with the testing tool 414 and any application.

The processing performed when searching for a data item such as using the partial path specification may be partitioned in a variety of different ways between the tool 414 and DLL 410. For example, in one embodiment, the tool 414 may issue a series of calls to the DLL to obtain one or more data items and may store a representation of the data items and associated paths used to identify the data items in the window. Such a representation may be constructed as needed based on the particular instructions of the script. Once the representation of the data items and paths is constructed, the information may be reused in connection with subsequent script processing.

Figure 10B:
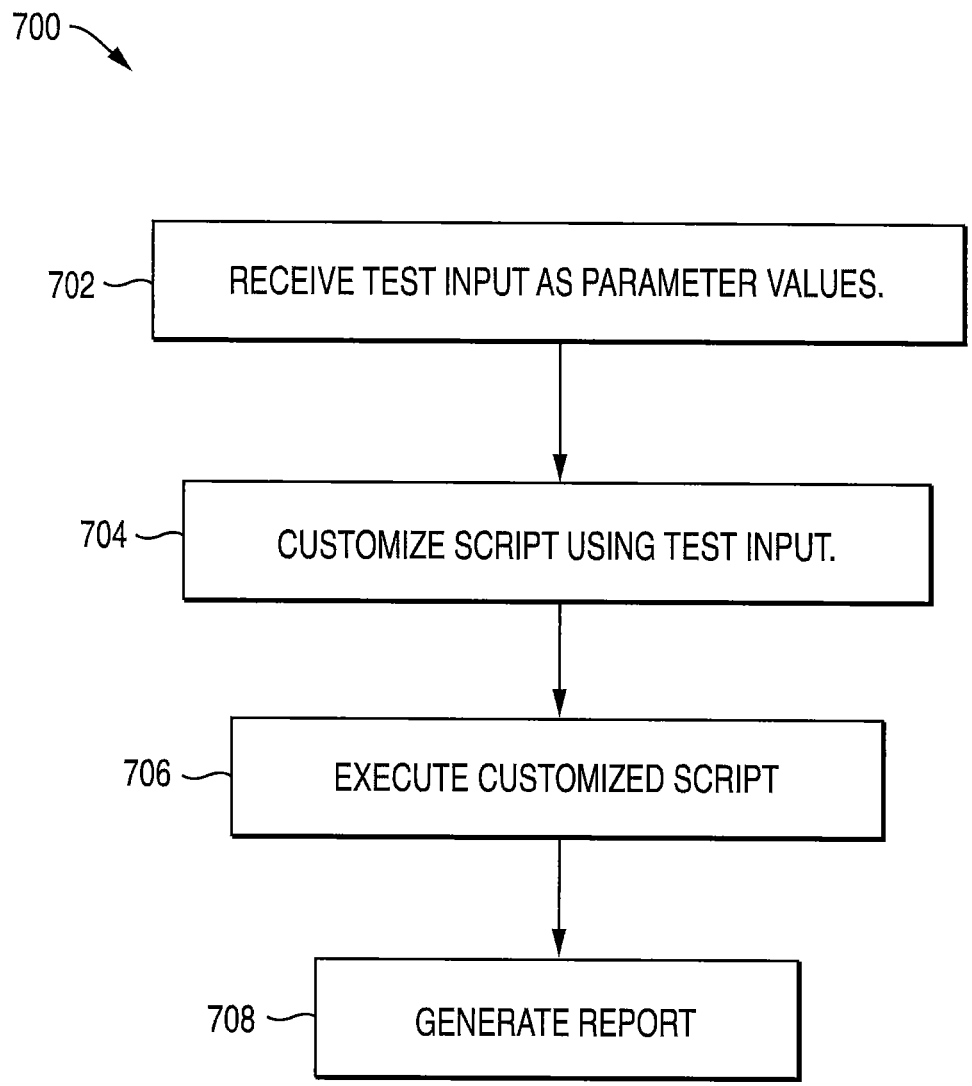
FIG. 10B is a flowchart of processing steps that may be performed in an embodiment in accordance with techniques herein.

Referring to FIG. 10B, shown is an example of a flowchart of processing steps as may be performed in an embodiment in accordance with techniques herein. The flowchart 700 summarizes processing described herein. At step 702, the test input values may be received as parameter values. At step 704, the customized script may be generating using the test input values from step 702. At step 706, the customized script is executed to perform the automated testing as described herein. At step 708, a report may be generated including results of the testing from step 706.

Figure 10C:
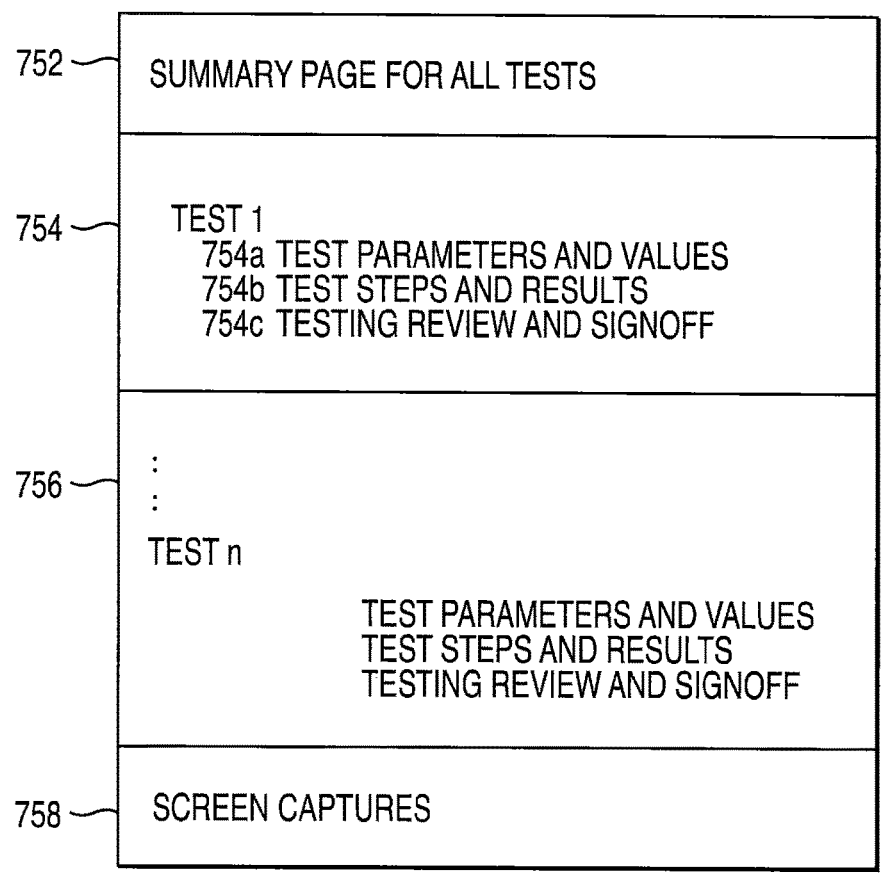

Referring to FIG. 10C, shown is an example representing a report format as may be generated in an embodiment in accordance with techniques herein. The example report format 750 may include a summary page of all tests executed 752, information on each test run such as represented by 754 and 756, and screen captures 758 of the GUI displayed as a results of the emulated user interactions caused by the script execution using the tool. The information for each test executed such as represented by 754 may include test parameters and values 754a, test steps and results 754b, and a testing review and signoff sheet 754c. The foregoing of FIG. 10C is illustrated and described in more detail below.

Referring to FIG. 11A-11I, shown are examples of information that may be included in a report generated in an embodiment in accordance with techniques herein as generally described in FIG. 10C. It should be noted that in some embodiments, the report generated in connection with testing may be stored as a document which cannot be modified. For example, the report may be stored in a database or other data container used in connection with the application and may have appropriate protections set so that no user of the application can modify the report.

With reference to FIG. 11A, shown is a first page of information that may be included in a report. The example 1000 illustrates a first summary page of information regarding testing performed using techniques herein. The example 1000 illustrates element 752 of FIG. 10C in more detail. In connection with this exemplary report, three scripts may be executed as indicated by 1004 for configuration verification, password complexity verification and access verification. Configuration verification may relate to verification with respect to the application's configuration including, for example, such options that may be set or specified by an administrator of the application. As indicated by 1002, a total of 3 tests or scripts were performed with 1 failure. The first page may also include other information about the application and system being tested 1006, information about each test run such as start and end date, whether the test passed or failed 1008, and the like. The first page may indicate the order in which the tests were executed based on the order of appearance in 1002. Although not illustrated in this example, other tests may be executed relating to instrument control, instrument data acquisition such as for PQ testing and verification, and the like.

Referring to FIG. 11B, shown is information regarding the configuration verification test parameters of the configuration verification test. The example 1100 includes those test script parameters and associated customized values as may be providing using test input and provides an illustration further detailing element 754a of FIG. 10C. The parameter names 1102 refer to test script parameters having values as indicated in 1106. Values of 1106 may be customized test input values as provided by a customer or user of the application being tested. Values of 1106 may be specified prior to execution of the test scripts to generate customized test scripts.

Referring to FIG. 11C, shown is an example of information as may be included regarding test steps and results for the configuration verification test. The example 1200 provides additional detail regarding element 754b of FIG. 10C as may be included for the configuration verification test. The example 1200 may provide details regarding the steps and procedures performed for the configuration verification test script and may also indicate expected results, actual results, and whether the step passed or failed.

Referring to FIG. 11D, shown is an example of information as may be included regarding testing review and signoff. The example 1300 provides additional detail regarding element 754c of FIG. 10C as may be included for the configuration verification test.

Referring to FIG. 11E1, shown is information regarding the password complexity test parameters of the password complexity verification test. In a manner similar to that as described in connection with FIG. 11B, the example 1400 includes those test script parameters and associated customized values as may be providing using test input and provides an illustration further detailing element 754a of FIG. 10C for the second test.

Referring to FIG. 11E2, shown is information regarding the password complexity test parameters of the access verification test. In a manner similar to that as described in connection with FIG. 11B, the example 1450 includes those test script parameters and associated customized values as may be providing using test input and provides an illustration further detailing element 754a of FIG. 10C for the third test.

Referring to FIG. 11F, shown is an example of information as may be included regarding test steps and results for the password complexity verification test. In a manner similar to that as described in connection with FIG. 11C, the example 1500 provides additional detail regarding element 754b of FIG. 10C as may be included for the password complexity verification test. In the example 1500, it should be noted by 1502 and 1504 that step 1 failed and a screen capture of the GUI display is illustrated in the report with reference to the image identified by AccessVerification_Step1_Picture 1 (FIG. 11I) included in the screen shots at the end of the report.

Figure 11G:
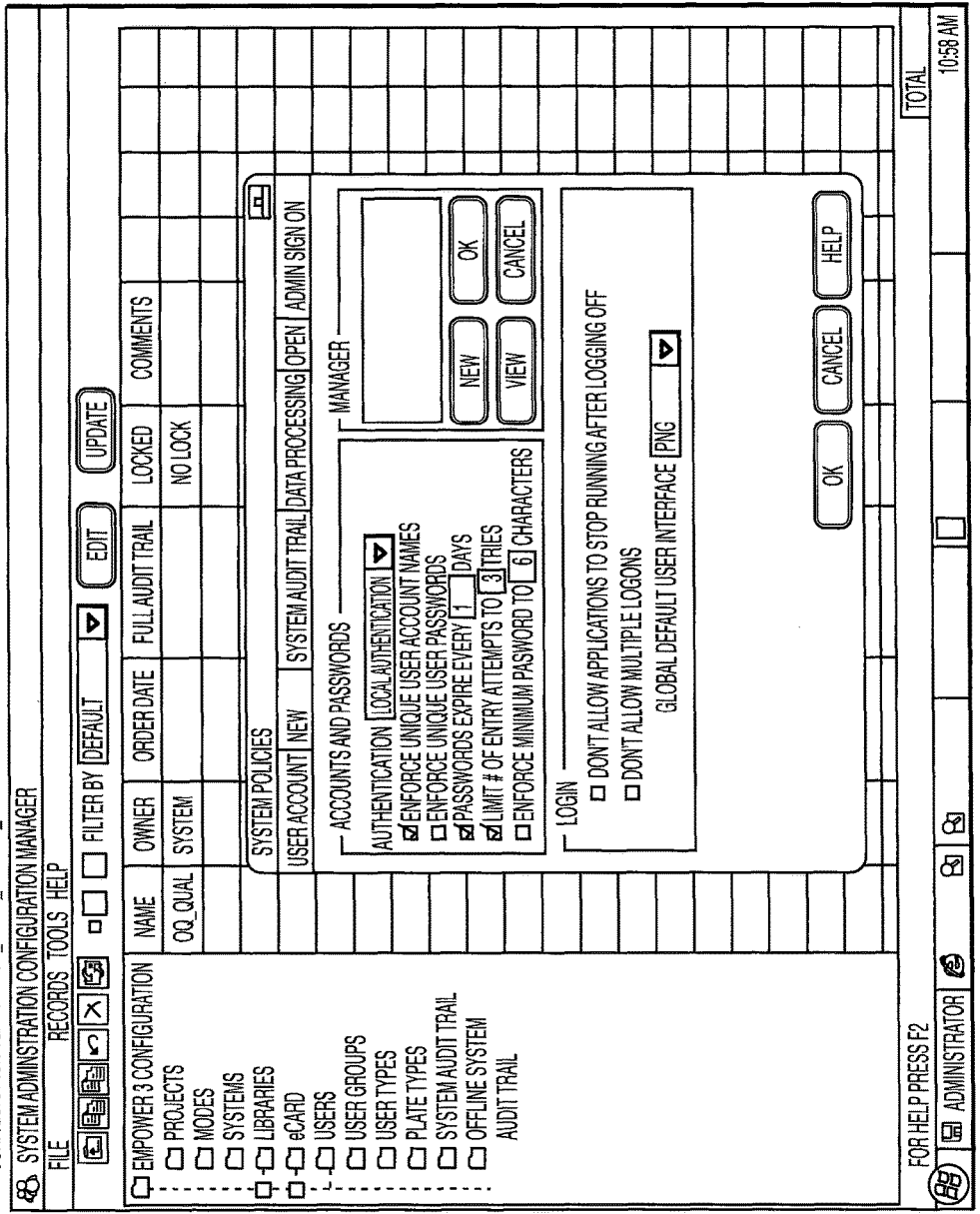
Figure 11H:
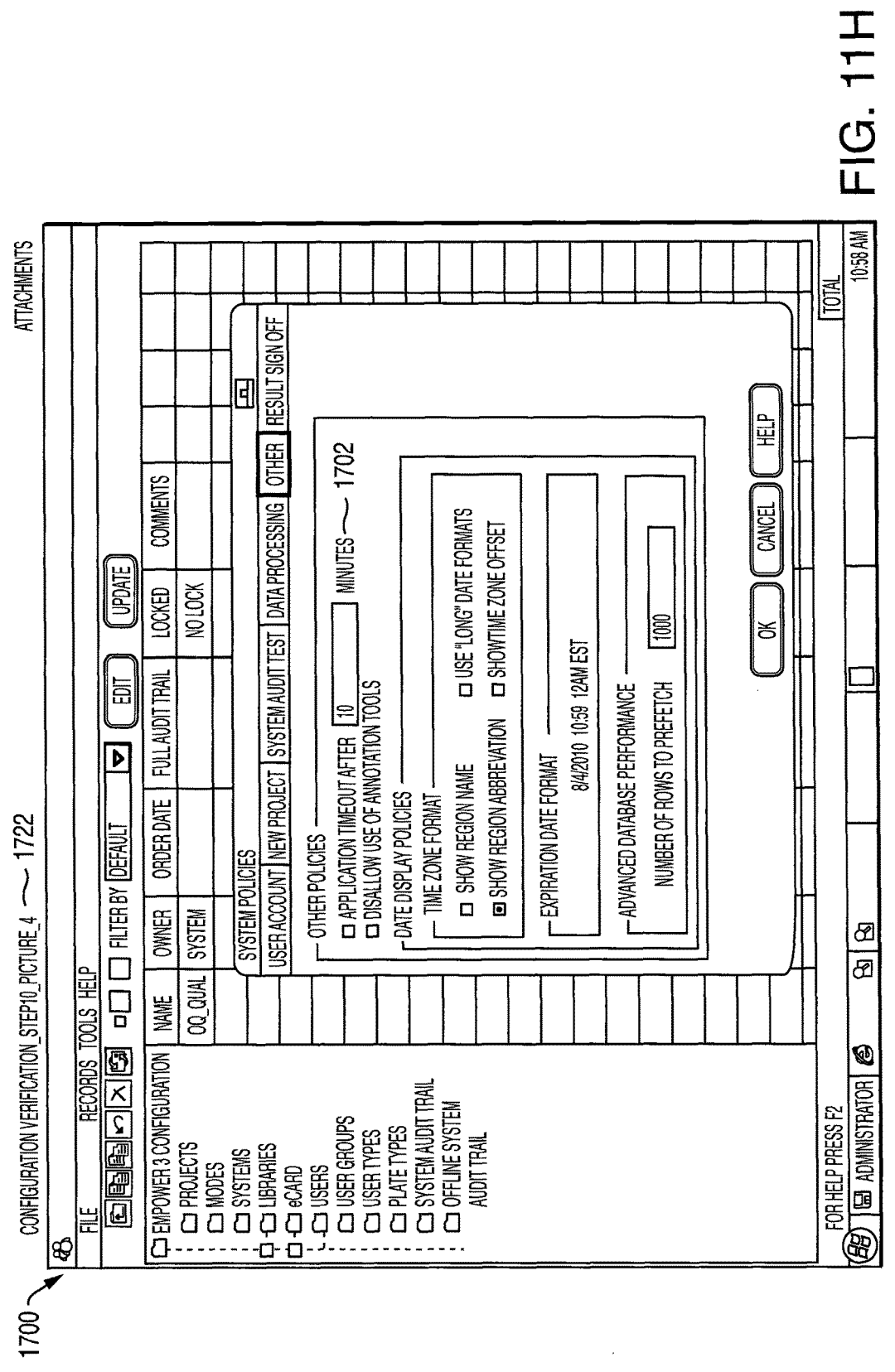
Figure 11I:
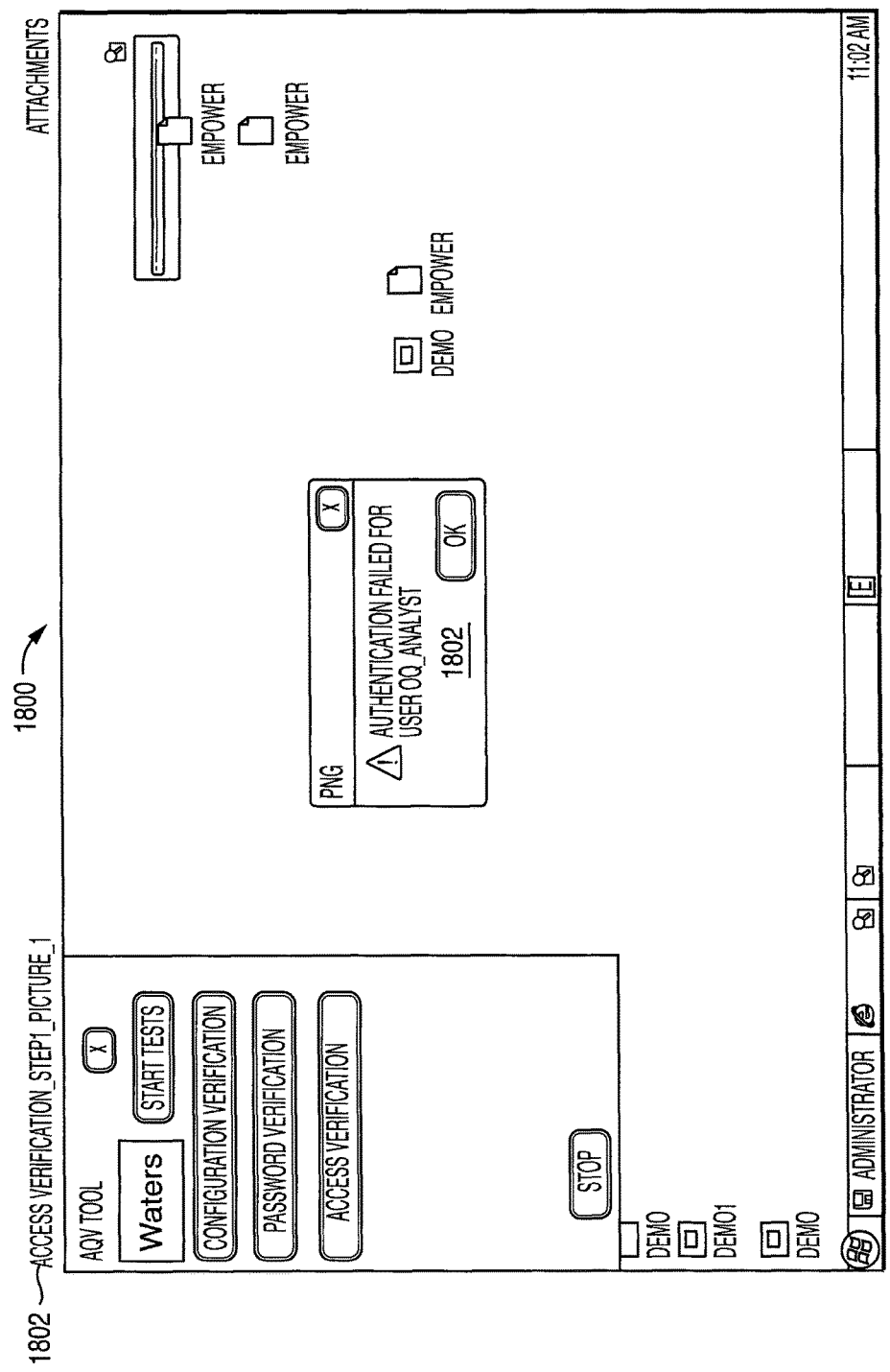

FIGS. 11G, 11H and 11I are images of screenshots obtained as a result of executing a particular procedure and step denoted by an identifier associated with the images. For example, with reference to FIG. 11I, the identifier 1802 has a corresponding usage in a previous portion of the report denoted by 1502 of FIG. 11F.

As illustrated in connection with the exemplary report and format, the report may outline steps of each test performed along with images embedded in the report explaining and illustrating the steps taken and capturing the results of the testing. The report provides a single document of test steps, results, errors, inputs and objective evidence regarding the testing results.

In connection with one embodiment and use in accordance with techniques herein, the testing and use of the tool and scripts may be performed by a service provider, such as a vendor or manufacturer of instruments, for its customers. The foregoing may be performed as a service for the customer to perform verification of an application or system at the customer's site using customer specified test inputs. A parameterized script may be used in connection with generating a first customized script for a first customer using the first customer's inputs. The same parameterized script may be used in connection with generating a second customized script for a second customer using the second customer's inputs. It should also be noted that the foregoing may also be performed by the customer, automatically performed by software (e.g., such as executing as a background process), based on a schedule, or otherwise performed on demand or as a result of a occurrence of one or more defined event-triggers.

The techniques herein may be used to generally test any software having a user interface. Provided above are some exemplary systems and uses. As an illustrative example described above, the techniques herein may be used with testing various aspects of a data system, alone or in combination with, instruments. As a further example, the techniques herein may be used to test various aspects of another system such as NuGenesis® Scientific Data Management System (SDMS) which provides functionality to collect, process, and distribute scientific information. With SDMS, laboratories are able to automatically capture, secure, access, and disseminate information from any analytical technology. SDMS may be characterized as an automated electronic repository that stores and manages all types of scientific data to a centralized database, offering integration with a multitude of research applications. More generally, as mentioned in various locations throughout, the techniques here may be used with testing any software through its user interface by emulating user interactions through automated testing using scripts which cause generation of the user inputs through the user interface. The user inputs are the same as those resulting through user manual inputs, selections, and the like, through the user interface. Thus, the testing techniques herein provide for testing with replication of environment and conditions which are the same as those occurring in connection with testing with manual user selections, inputs, and the like.

It should also be noted that embodiments are described herein which use scientific instruments. More generally, the techniques herein may be used in embodiments with any type of instrument or other device, as well as in connection with software systems that are not connected to and do not utilize and type of device.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for testing an application comprising:

receiving a parameterized script including one or more testing parameters;

receiving test inputs including a set of one or more customized testing parameter values, said set including a corresponding customized testing parameter value for each of the one or more testing parameters;

generating, by a testing tool using a first set of inputs including the parameterized script and the test inputs, a test script including one or more instructions and the one or more customized testing parameter values used to test an application, wherein said generating includes substituting a corresponding customized testing parameter value from the set for each of the one or more testing parameters in the parameterized script;

verify, using said test script, one or more tests performed as part of qualification of a chromatography or mass spectrometry instrument;

verify, using said test script, first data displayed as a graph using a user interface, said first data being generated by said chromatography or mass spectrometry instrument in connection with performance testing of said chromatography or mass spectrometry instrument;

emulating a user interaction with the user interface of said application, said emulating comprising:
  automating the user interaction with the user interface to test said application;
  executing, based on the automated user interaction with the user interface, a first portion of said one or more instructions in said test script using the one or more customized testing parameter values also included in the test script to test the user interface of the application;
  wherein the automated user interaction comprises setting one or more parameters of the chromatography or mass spectrometry instrument based on the one or more customized testing parameter values;
  receiving, based on the executed first portion, an output including information displayed using said user interface in response to said emulated user interaction;

performing verification processing for said output, said verification processing including executing a second portion of said one or more instructions in said test script, wherein a first instruction in said test script includes a partial path specification for a user interface data element, wherein user interface data elements are represented by nodes included in a hierarchy having at least three levels of nodes, said hierarchy including a root node at a first level of the hierarchy, said user interface data element being represented by a first node at another level of the hierarchy wherein a complete path for said user interface data element identifies a location of said user interface data element in said user interface by specifying a node at each level of the hierarchy from the root node at the first level to the first node at the another level, wherein said partial path specification in the test script includes said root node and a unique data element identifier for said user interface data element corresponding to the first node and wherein the partial path specification omits at least one other node of the complete path, said unique data element identifier uniquely identifying said user interface data element from other user interface data elements of the user interface; and generating a report including results of said verification processing, said report including at least one image graphically illustrating said user interface provided as a result of executing said first portion of said one or more instructions, wherein said at least one image is generated as a result of the execution of said one or more instructions in said second portion.

2. The method of claim 1, wherein said first node is a leaf in said hierarchy.

3. The method of claim 2, wherein said partial path specification of the first instruction includes a window identifier corresponding to said root node at said first level.

4. The method of claim 3, wherein said hierarchy includes four levels of nodes and said partial path specification omits identification of all levels other than a top level including said root node and a bottom level including the first node.

5. The method of claim 4, further comprising:
searching for said user interface data element in said hierarchy, and wherein said first instruction includes criteria indicating a portion of the hierarchy to be excluded when searching for said user interface data element in said hierarchy.

6. The method of claim 3, wherein said unique data element identifier is a name referenced by said application uniquely identifying said user interface data element from other user interface data elements.

7. The method of claim 1, wherein said first instruction includes a parameter having a customized value supplied by a customer, wherein said test script is used for a first customer providing a first input for said parameter and a second customer providing a second input different from said first input for said parameter.

8. The method of claim 1, wherein said test script is executed by the testing tool that communicates with said user interface and the method further comprising:
issuing a first request by said testing tool to said user interface for a handle to said user interface data element; and providing, by said user interface, said handle to said testing tool in response to said first request.

9. The method of claim 8, further comprising:
issuing, by said testing tool to a first code module, a second request to retrieve said user interface data element using said handle;
issuing, by said first code module to said application, a third request to retrieve said user interface data element using said handle;
providing, by said application, first data including said user interface data element to said first code module in response to said third request; and
providing, by said first code module, said user interface data element to said testing tool.

10. The method of claim 9, wherein said first code module processes said first data to generate said user interface data element in a format expected by said testing tool.

11. The method of claim 10, wherein said user interface data element is a table of a plurality of data values.

12. The method of claim 10, wherein said user interface data element is any of a row, a column or an element in a multi-dimensional vector.

13. The method of claim 1, wherein the method is performed by a service provider to verify execution of said application on a computer system of a customer.

14. The method of claim 1, wherein said test script is used to verify control settings of a device and data acquired using said device.

15. The method of claim 1, wherein said test script is executed by the testing tool and the method further comprises:
performing first processing to obtain said user interface data element; and
verifying, by the testing tool, that the user interface data element matches expected output.

16. The method of claim 15, wherein said first processing comprises: obtaining, by said testing tool from the user interface, a handle to the user interface data element;
issuing, by said testing tool to a library, a first request to obtain the user interface data element, wherein said first request is in accordance with a first application programming interface that includes the handle as a parameter; obtaining, by the library from the application, first data including the user interface data element; and responsive to the first request, returning the user interface data element from the library to the testing tool.

17. The method of claim 16, wherein the user interface element is referenced in the test script using an identifier name that does not vary with changes to a corresponding tag for the user interface data element in the user interface.

18. The method of claim 1, wherein said unique data element identifier included in the partial path specification is determined independent of a corresponding identifier used by the user interface to identify the user interface data element.

19. The method of claim 1, wherein the unique data element identifier included in the partial path specification does not vary with changes to a corresponding tag for the user interface data element in the user interface.

20. A system comprising: one or more processors; an instrument that performs any of liquid chromatography and mass spectrometry; an application comprising an application server portion and an application client portion;
a server in communication with said instrument and executing said application server thereon;
a client in communication with said server and executing said application client thereon, said client further including a non-transitory computer readable medium with code thereon that, when executed, performs a method comprising:
receiving a parameterized script including one or more testing parameters; receiving test inputs including a set of one or more customized testing parameter values, said set including a corresponding customized testing parameter value for each of the one or more testing parameters;
generating, by a testing tool using a first set of inputs including the parameterized script and the test inputs, a test script including one or more instructions and the one or more customized testing parameter values used to test said application, wherein said generating includes substituting a corresponding customized testing parameter value from the set for each of the one or more testing parameters in the parameterized script said test script;
verify, using said test script, one or more tests performed as part of qualification of a chromatography or mass spectrometry instrument;
verify, using said test script, first data displayed as a graph using said user interface, said first data being generated by said chromatography or mass spectrometry instrument in connection with performance testing of said chromatography or mass spectrometry instrument;

emulating a user interaction with the user interface of said application, said emulating comprising:

automating the user interaction with the user interface to test said application;

executing, based on the automated user interaction with the user interface, a first portion of said one or more instructions in said test script using the one or more customized testing parameter values also included in the test script to test the user interface of the application;

wherein the automated user interaction comprises setting one or more parameters of the chromatography or mass spectrometry instrument based on the one or more customized testing parameter values;

receiving, based on the executed first portion, an output of results related to verification of software used in connection with said instrument, said output including information displayed using said user interface in response to said emulated user interaction;

performing verification processing for said output, said verification processing including executing a second portion of said one or more instructions in said test script, wherein a first instruction in said test script includes a partial path specification for a user interface data element, wherein user interface data elements are represented by nodes included in a hierarchy having at least three levels of nodes, said hierarchy including a root node at a first level of the hierarchy, said user interface data element being represented by a first node at another level of the hierarchy wherein a complete path for said user interface data element identifies a location of said user interface data element in said user interface by specifying a node at each level of the hierarchy from the root node at the first level to the first node at the another level, wherein said partial path specification in the test script includes said root node and a unique data: element identifier for said user interface data element corresponding to the first node and wherein the partial path specification omits at least one other node of the complete path, said unique data element identifier uniquely identifying said user interface data element from other user interface data elements of the user interface: and generating a report including results of said verification processing, said report including at least one image graphically illustrating said user interface provided as a result of executing said first portion of said one or more instructions, wherein said at least one image is generated as a result of the execution of said one or more instructions in said second portion.

21. A non-transitory computer readable medium comprising code thereon that, when executed, performs a method that tests an application, the method comprising:

receiving a parameterized script including one or more testing parameters;

receiving test inputs including a set of one or more customized testing parameter values, said set including a corresponding customized testing parameter value for each of the one or more testing parameters;

generating, by a testing tool using a first set of inputs including the parameterized script and the test inputs, a test script including one or more instructions and the one or more customized testing parameter values used to test an application, wherein said generating includes substituting a corresponding customized testing parameter value from the sot for each of the one or more testing parameters in the parameterized script;

verify, using said test script, one or more tests performed as part of qualification of a chromatography or mass spectrometry instrument;

verify, using said test script, first data displayed as a graph using a user interface, said first data being generated by said chromatography or mass spectrometry instrument in connection with performance testing of said chromatography or mass spectrometry instrument;

emulating a user interaction with the user interface of said application, said emulating comprising:

automating the user interaction with the user interface to test said application;

executing, based on the automated user interaction with the user interface, a first portion of said one or more instructions in said test script using the one or more customized testing parameter values also included in the test script to test the user interface of the application;

wherein the automated user interaction comprises setting one or more parameters of the chromatography or mass spectrometry instrument based on the one or more customized testing parameter values;

receiving, based on the executed first portion, an output including information displayed using said user interface in response to said emulated user interaction;

performing verification processing for said output, said verification processing including executing a second portion of said one or more instructions in said test script, wherein a first instruction in said test script includes a partial path specification for a user interface data element, wherein user interface data elements are represented by nodes included in a hierarchy having at least three levels, of nodes, said hierarchy including a root node at a first level of the hierarchy, said user interface data element being represented by a first node at another level of the hierarchy wherein a complete path for said user interface data element identifies a location of said user interface data element in said user interface by specifying a node at each level of the hierarchy from the root node at the first level to the first node at the another level, wherein said partial path specification in the test script includes said root node and a unique data element identifier for said user interface data element corresponding to the first node and wherein partial path specification omits at least one other node of the complete path, said unique data element identifier uniquely identifying said user interface data element from other user interface data elements of the user interface: and generating a report including results of said verification processing, said report including at least one image graphically illustrating said user interface provided as a result of executing said first portion of said one or more instructions, wherein said at least one image is generated as a result of the execution of said one or more instructions in said second portion.

22. The non-transitory computer readable medium of claim 21, wherein said test script is used to administrative operations performed in connection with management of said application by an administrator.

23. The non-transitory computer readable medium of claim 22, wherein said test script is used in connection with testing security and access to said application, wherein one or more application settings are specified using said test script using an administrator login and said test script tests whether proper access and security are provided in accordance with said one or more application settings, wherein a first of said application settings limits any of access and operations that can be performed by one or more users of said application, and wherein said first application setting limits any of access and operations with respect to a device having its operation controlled using said application.

* * * * *